(12) United States Patent
Kliegl et al.

(10) Patent No.: US 11,556,775 B2
(45) Date of Patent: Jan. 17, 2023

(54) SYSTEMS AND METHODS FOR TRACE NORM REGULARIZATION AND FASTER INFERENCE FOR EMBEDDED MODELS

(71) Applicant: Baidu USA, LLC, Sunnyvale, CA (US)

(72) Inventors: Markus Kliegl, Santa Clara, CA (US); Siddharth Goyal, San Jose, CA (US); Kexin Zhao, Santa Clara, CA (US); Kavya Srinet, Sunnyvale, CA (US); Mohammad Shoeybi, San Mateo, CA (US)

(73) Assignee: Baidu USA LLC, Sunnyvale, CA (US)

( * ) Notice: Subject to any disclaimer, the term of this patent is extended or adjusted under 35 U.S.C. 154(b) by 1138 days.

(21) Appl. No.: 16/150,855

(22) Filed: Oct. 3, 2018

(65) Prior Publication Data
US 2019/0122108 A1    Apr. 25, 2019

Related U.S. Application Data

(60) Provisional application No. 62/576,470, filed on Oct. 24, 2017.

(51) Int. Cl.
*G06F 17/16* (2006.01)
*G06N 3/08* (2006.01)
(Continued)

(52) U.S. Cl.
CPC ............... *G06N 3/08* (2013.01); *G06F 17/16* (2013.01); *G06N 5/04* (2013.01); *G10L 15/063* (2013.01); *G10L 15/16* (2013.01)

(58) Field of Classification Search
CPC .......... G06N 3/08; G06N 5/04; G06N 3/0472; G06N 3/0481; G06N 3/0445; G06N 3/0454; G06F 17/16
See application file for complete search history.

(56) References Cited

U.S. PATENT DOCUMENTS

| 5,228,113 A * | 7/1993 | Shelton | G06N 3/084 706/25 |
| 5,596,681 A * | 1/1997 | Tamura | G06N 3/082 706/31 |

(Continued)

OTHER PUBLICATIONS

Sindhwani et al.,"Structured transforms for small-footprint deep learning," In Advances in Neural Information Processing Systems, 2015. (9pgs).

(Continued)

*Primary Examiner* — Jesse S Pullias
(74) *Attorney, Agent, or Firm* — North Weber & Baugh LLP

(57) ABSTRACT

Described herein are systems and methods for compressing and speeding up dense matrix multiplications as found, for examples, in the fully connected and recurrent layers of neural networks for embedded large vocabulary continuous speech recognition (LVCSR). For compression, trace norm regularization technique embodiments were introduced and studied for training low rank factored versions of matrix multiplications. Compared to standard low rank training, the methods more consistently lead to good accuracy versus number of parameter trade-offs and can be used to speed-up training of large models. Faster inference may be further enabled on ARM processors through kernels optimized for small batch sizes, resulting in speed ups over the currently used library. Beyond LVCSR, the techniques are also generally applicable to embedded neural networks with large fully connected or recurrent layers.

20 Claims, 12 Drawing Sheets

(51) Int. Cl.
  *G06N 5/04* (2006.01)
  *G10L 15/06* (2013.01)
  *G10L 15/16* (2006.01)

(56) References Cited

U.S. PATENT DOCUMENTS

| | | | |
|---|---|---|---|
| 6,292,772 B1 | 9/2001 | Kantrowitz | |
| 7,035,802 B1 | 4/2006 | Rigazio | |
| 10,755,162 B2* | 8/2020 | Han | G06N 3/0454 |
| 2006/0031069 A1 | 2/2006 | Huang | |
| 2013/0317755 A1 | 11/2013 | Mishra | |
| 2015/0269933 A1 | 9/2015 | Yu | |
| 2016/0171974 A1 | 6/2016 | Hannun | |
| 2016/0321777 A1 | 11/2016 | Jin | |
| 2017/0011738 A1 | 1/2017 | Senior | |
| 2017/0098153 A1 | 4/2017 | Mao | |
| 2017/0103752 A1 | 4/2017 | Senior | |
| 2017/0148431 A1 | 5/2017 | Catanzaro | |
| 2017/0148433 A1 | 5/2017 | Catanzaro | |
| 2018/0011688 A1 | 1/2018 | Wei | |
| 2018/0061439 A1 | 3/2018 | Diamos | |
| 2018/0107925 A1* | 4/2018 | Choi | G06N 3/08 |
| 2018/0247643 A1 | 8/2018 | Battenberg | |
| 2019/0258917 A1* | 8/2019 | Chai | G06K 9/6267 |

OTHER PUBLICATIONS

Srebro et al.,"Maximum-Margin matrix factorization," In Advances in neural information processing systems, 2005. (8pgs).

Vanhoucke et al., "Improving the speed of neural networks on CPUs," In Proc. Deep Learning and Unsupervised Feature Learning NIPS Workshop, 2011. (8pgs).

Xue et al.,"Restructuring of deep neural network acoustic models with singular value decomposition," In Interspeech, 2013. (5pgs).

Chung et al.,"Empirical evaluation of gated recurrent neural networks on sequence modeling," Dec. 11, 2014, arXiv preprint arXiv:1412.3555, 2014. (9pgs).

Ciliberto et al.,"Reexamining low rank matrix factorization for trace norm regularization," Jun. 27, 2017, arXiv preprint arXiv:1706.08934, 2017. (22pgs).

Denil et al.,"Predicting parameters in deep learning" Jun. 3, 2013, arXiv preprint arXiv:1306.0543, 2013. (9pgs).

Denton et al.,"Exploiting linear structure within convolutional networks for efficient evaluation," In Advances in Neural Information Processing Systems, 2014. (9pgs).

Han et al.,"Deep Compression: Compressing deep neural networks with pruning, trained quantization and huffman coding," Oct. 2015, arXiv preprint arXiv:1510.00149, 2015.(11pgs).

Iandola et al.,"SqueezeNet: AlexNet-level accuracy with 50x fewer parameters and <1MB model size," Feb. 24, 2016, arXiv preprint arXiv:1602.07360, 2016. (5pgs).

Jacob & Warden,"gemmlowp: a small self-contained low-precision GEMM library," Retrieved from Internet < URL:https://github.com/google/gemmlowp>, 2015-2017.(8pgs).

Graham Jameson,"Summing and nuclear norms in Banach space theory," vol. 8. Cambridge University Press, 1987.(2pgs).

Koren et al.,"Matrix factorization techniques for recommender systems," Published by the IEEE Computer Society, 42(8), 2009. (42pgs).

Kuchaiev & Ginsburg,"Factorization tricks for LSTM networks," Mar. 31, 2017, arXiv preprint arXiv:1703.10722, 2017. (5pgs).

Alvarez et al.,"On the efficient representation and execution of deep acoustic models," In Proceedings of Annual Conference of the International Speech Communication Association (Interspeech), Jul. 15, 2016. Retrieved from Internet < URL: https://arxiv.org/abs/1607.04683v1> (5pgs).

Alvarez et al.,"On the efficient representation and execution of deep acoustic models," In Proceedings of Annual Conference of the International Speech Communication Association (Interspeech), Dec. 17, 2016. Retrieved from Internet < URL: https://arxiv.org/abs/1607.04683v2> (5pgs).

Amodei et al.,"Deep Speech 2: End-to-End Speech Recognition in English and Mandarin," Dec. 8, 2015, Retrieved from Internet < URL:https://arxiv.org/pdf/1512.02595.pdf>. (28pgs).

Ba & Caruana, "Do deep nets really need to be deep?" Dec. 21, 2013, Retrieved from Internet < URL: https://arxiv.org/pdf/1312.6184v1.pdf>. (5pgs).

Chen et al.,"Compressing neural networks with the hashing trick," In International Conference on Machine Learning, Apr. 19, 2015. Retrieved from Internet < URL: https://arxiv.org/abs/1504.04788>. (10pgs).

Cho et al.,"On the properties of neural machine translation: Encoder-Decoder Approaches," Sep. 3, 2014, Retrieved from Internet < URL: https://arxiv.org/abs/1409.1259v1 >. (9pgs).

LeCun et al., "Optimal Brain Damage," In Advances in Neural Information Processing Systems,1989. (8pgs).

Liu et al., "Gram-CTC: Automatic unit selection and target decomposition for sequence labelling," Aug. 12, 2017, arXiv preprint arXiv:1703.00096, 2017. (10pgs).

Lu et al., "Learning compact recurrent neural networks," Retrieved from Internet <URL: https://arxiv.org/pdf/1604.02594.pdf>, Apr. 9, 2016. (5 pgs).

Ian McGraw et al.,"Personalized speech recognition on mobile devices," Retrieved from Internet <URL: https://arxiv.org/pdf/1603.03185v1.pdf>, Mar. 2016. (5 pgs).

Narang et al.,"Exploring sparsity in recurrent neural networks," In International Conference on Learning Representations (ICLR), 2017. (7pgs).

Neyshabur et al.,"In search of the real inductive bias: On the role of implicit regularization in deep learning," Mar. 2015, Retrived from Internet : <URL:https://arxiv.org/pdf/1412.6614v3.pdf>. (9pgs).

Prabhavalkar et al.,"On the compression of recurrent neural networks with an application to LVCSR acoustic modeling for embedded speech recognition," Mar. 2016, Retrived from Internet <URL: https://arxiv.org/pdf/1603.08042v1.pdf>. (6pgs).

Sainath et al.,"Low-rank matrix factorization for deep neural network training with high-dimensional output targets," In Acoustics, Speech and Signal Processing, 2013. (5pgs).

Graves et al., "Connectionist Temporal Classification: Labelling Unsegmented Sequence Data with Recurrent Neural Networks," In Proceedings of the 23rd international conference on Machine learning, 2006. (8 pgs).

Cho et al., "Learning phrase representations using RNN Encoder-Decoder for statistical machine translation," arXiv preprint, arXiv:1406.1078, 2014.(14 pgs).

Sutskever et al., "Sequence to sequence learning with neural networks," In Advances in neural information processing systems, 2014. (9 pgs).

Chan et al., "Listen, attend and spell: A neural network for large vocabulary conversational speech recognition," In 2016 IEEE on (ICASSP), 2016. (5 pgs).

Hannun et al.,"Deep Speech: Scaling up End-to-End speech recognition," CoRR, abs/1412.5567, 2014. (12 pgs).

Bahdanau et al., "End-to-End Attention-Based large vocabulary speech recognition," In 2016 IEEE on (ICASSP), 2016. (5 pgs).

Sébastien et al.,"On using very large target vocabulary for neural machine translation," 2015. (10 pgs).

Vinyals et al., "Grammar as a foreign language," In Advances in Neural Information Processing Systems, pp. 2773-2781, 2015. (9 pgs).

Chorowski et al., "Attention-based models for speech recognition," In Advances in Neural Information Processing Systems, 2015. (9 pgs).

C. Laurent et al., "Batch normalized recurrent neural networks," abs/1510.01378, 2015. http://arxiv.org/abs/1510.01378 (9pgs).

Q. Le et al., "Building high-level features using large scale unsupervised learning," In International Conference on Machine Learning, 2012 (11pgs).

Y. LeCun et al., "Learning methods for generic object recognition with invariance to pose and lighting," In Computer Vision and Pattern Recognition, 2:97-104, 2004 (8pgs).

A. Maas et al., "Lexicon-free conversational speech recognition with neural networks," In NAACL, 2015 (10pgs).

(56) References Cited

OTHER PUBLICATIONS

Y. Miao et al., "EESEN: End-to-end speech recognition using deep rnn models and wfst-based decoding," In ASRU, 2015 (8pgs).
A. Mohamed et al., "Acoustic modeling using deep belief networks," IEEE Transactions on Audio, Speech, and Language Processing, (99), 2011 (10pgs).
A.S.N. Jaitly et al., "Application of pretrained deep neural networks to large vocabulary speech recognition," In Interspeech, 2012 (11 pgs).
Nervana Systems. Nervana GPU, https://github.com/NervanaSystems/nervanagpu, Accessed: Nov. 6, 2015 (5pgs).
J. Niu, "Context-dependent deep neural networks for commercial mandarin speech recognition applications," In APSIPA, 2013 (5pgs).
V. Panayotov et al., "Librispeech: an asr corpus based on public domain audio books," In ICASSP, 2015 (5pgs).
O. Abdel-Hamid et al., "Applying convolutional neural networks concepts to hybrid nn-hmm model for speech recognition," In ICASSP, 2012 (4pgs).
D. Bahdanau et al., "Neural machine translation by jointly learning to align and translate," In ICLR, 2015 (15pgs).
D. Bahdanau et al., "End-to-end attention-based large vocabulary speech recognition." abs/1508.04395, 2015. http://arxiv.org/abs/1508.04395 (8pgs).
J. Barker et al., The third 'CHiME' speech separation and recognition challenge: Dataset, task and baselines. 2015. Submitted to IEEE 2015 Automatic Speech Recognition and Understanding Workshop (ASRU) (9pgs).
Y. Bengio et al., "Curriculum learning," In International Conference on Machine Learning, 2009 (8pgs).
H. Bourlard et al., "Connectionist Speech Recognition: A Hybrid Approach," Kluwer Academic Publishers, Norwell, MA, 1993 (291pgs).
W. Chan et al., "Listen, attend, and spell," abs/1508.01211, 2015, http://arxiv.org/absZ1508.01211 (16pgs).
Xiong et al.,"The microsoft 2016 conversational speech recognition system," arXiv preprint, arXiv:1609.03528, 2016a. (5 pgs).
Wu et al.,"Google's neural machine translation system: Bridging the gap between human and machine translation," CoRR, abs/1609.08144, 2016a. (23 pgs).
Chan et al.,"Latent Sequence Decompositions," In Arxiv, 2016b. Retrieved from Internet < URL:https://arxiv.org/pdf/1610.03035v1.pdf> (11pgs).
Amodei et al.,"Deep speech 2: End-to-End speech recognition in english and mandarin," arXiv preprint, arXiv:1512.02595, 2015. (28 pgs).
Wu et al.,"Google's neural machine translation system: Bridging the gap between human and machine translation," arXiv preprint, arXiv:1609.08144, 2016b. (23 pgs).
Collobert et al.,"Wav2letter: an End-to-End ConvNet-based speech recognition system," arXiv preprint, arXiv:1609.03193, 2016. (8 pgs).
Zweig et al.,"Advances in All-Neural speech recognition," arXiv preprint, arXiv:1609.05935, 2016a. (5 pgs).
Soltau et al.,"Neural speech recognizer: Acoustic-to-Word LSTM model for large vocabulary speech recognition," arXiv preprint, arXiv:1610.09975, 2016. (6 pgs).
Lee & Hon,"Large-vocabulary speaker independent continuous speech recognition using HMM," In Acoustics, Speech, and Signal Processing, 1988. (6 pgs).
Sercu & Goel,"Dense prediction on sequences with time-dilated convolutions for speech recognition," arXiv preprint, arXiv:1611.09288, 2016. (5 pgs).
Laurent et al. "Batch Normalized Recurrent Neural Networks," arXiv preprint arXiv:1510.01378, Oct. 2015 (9 pgs).
Balkir et al. "A distributed look-up architecture for text mining applications using mapreduce." Proceedings of 2011 International Conference for High Performance Computing, Networking, Storage and Analysis. ACM, 2011.(11 pgs).
Chen et al. "Berkeley at NTCIR-2: Chinese, Japanese, and English IR experiments." NTCIR. 2001. (9 pgs).

Sak, Hasim, et al. "Learning acoustic frame labeling for speech recognition with recurrent neural networks." Acoustics, Speech and Signal Processing (ICASSP), 2015 IEEE International Conference on. IEEE, 2015. (5 pgs).
Graves, Alex, et al. "Connectionist temporal classification: labelling unsegmented sequence data with recurrent neural networks." Proceedings of the 23rd international conference on Machine learning. ACM, 2006. (8 pgs).
Peddinti, Vijayaditya, Daniel Povey, and Sanjeev Khudanpur. "A time delay neural network architecture for efficient modeling of long temporal contexts." INTERSPEECH. 2015. (5 pgs).
Collobert, Ronan, and Jason Weston. "A unified architecture for natural language processing: Deep neural networks with multitask learning." Proceedings of the 25th international conference on Machine learning. ACM, 2008. (8 pgs).
M. Schuster et al., "Bidirectional recurrent neural networks," IEEE Transactions on Signal Processing, 45(11):2673-2681, 1997 (9pgs).
F. Seide et al., "Conversational speech transcription using context-dependent deep neural networks," In Interspeech, pp. 437-440, 2011 (4pgs).
J. Shan et al., "Search by voice in mandarin Chinese," In Interspeech, 2010 (5pgs).
H. Soltau et al., "Joint training of convolutional and non-convolutional neural networks," In ICASSP, 2014 (5pgs).
I. Sutskever et al., "On the importance of momentum and initialization in deep learning," In 30th International Conference on Machine Learning, 2013 (14pgs).
I. Sutskever et al., "Sequence to sequence learning with neural networks," 2014, http://arxiv.org/abs/1409.3215 (9pgs).
C. Szegedy et al., "Batch normalization: Accelerating deep network training by reducing internal covariate shift," abs/1502.03167, 2015, http://arxiv.org/abs/1502.03167,11pgs.
C. Szegedy et al., "Going deeper with convolutions," 2014 (9pgs).
R. Thakur et al., "Optimization of collective communication operations in mpich," International Journal of High Performance Computing Applications, 19:49-66, 2005 (17pgs).
K. Vesely et al., "Sequence-discriminative training of deep neural networks," In Interspeech, 2013 (5pgs).
A. Waibel et al., "Phoneme recognition using time-delay neural networks,â˜ A'I acoustics speech and signal processing," IEEE Transactions on Acoustics, Speech and Signal Processing, 37(3):328-339, 1989 (12pgs).
R. Williams et al., "An efficient gradient-based algorithm for online training of recurrent network trajectories," Neural computation, 2:490-501, 1990 (12pgs).
T. Yoshioka et al., "The ntt chime-3 system: Advances in speech enhancement and recognition for mobile multi-microphone devices," In IEEE ASRU, 2015 (1pg).
W. Zaremba et al., "Learning to execute," abs/1410.4615, 2014, http://arxiv.org/abs/1410.4615 (8pgs).
J. Dean et al., "Large scale distributed deep networks," In Advances in Neural Information Processing Systems 25, 2012 (97pgs).
D. Ellis et al., "Size matters: An empirical study of neural network training for large vocabulary continuous speech recognition," In ICASSP 2:1013-1016, IEEE 1999 (4pgs).
E. Eisen, "Optimizing RNN performance," http://svail.github.io/rnn_perf. Accessed: Nov. 24, 2015 (18pgs).
M. J. Gales et al., "Support vector machines for noise robust ASR," In ASRU, pp. 205-2010, 2009 (4pgs).
A. Graves et al., "Connectionist temporal classification: Labelling unsegmented sequence data with recurrent neural networks," In ICML, pp. 369-376. ACM, 2006 (8pgs).
A. Graves et al., "Towards end-to-end speech recognition with recurrent neural networks," In ICML, 2014 (9pgs).
A. Graves et al., "Speech recognition with deep recurrent neural networks," In ICASSP, 2013 (5pgs).
H. H. Sak et al., "Long short-term memory recurrent neural network architectures for large scale acoustic modeling," In Interspeech, 2014 (5pgs).
A. Hannun et al., "Deep speech: Scaling up end-to-end speech recognition," 1412.5567, 2014. http://arxiv.org/abs/1412.5567 (12pgs).

(56) References Cited

OTHER PUBLICATIONS

A.Y. Hannun et al., "First-pass large vocabulary continuous speech recognition using bi-directional recurrent DNNs," abs/1408.2873, 2014. http://arxiv.org/abs/1408.2873, 7pgs.
Xiong et al.,"Achieving human parity in conversational speech recognition," arXiv preprint, arXiv:1610.05256, 2016b. (12 pgs).
Chan et al.,"Listen, attend and spell," arXiv preprint, arXiv:1508.01211, 2015. (12 pgs).
Doss et al.,"Phoneme-Grapheme based speech recognition system," In Automatic Speech Recognition and Understanding, 2003. (5 pgs).
Chung et al.,"Hierarchical Multiscale Recurrent Neural Networks," arXiv preprint, arXiv:1609.01704, 2016. (15 pgs).
Luong & Manning,"Achieving open vocabulary neural machine translation with hybrid word-character models," arXiv preprint, arXiv:1604.00788, 2016.(11 pgs).
Sak et al.,"Fast and accurate recurrent neural network acoustic models for speech recognition," CoRR, abs/1507.06947, 2015. (5 pgs).
Kim et al., Joint CTC-Attention based End-to-End speech recognition using Multi-task learning, arXiv preprint arXiv:1609.06773, 2016. (5 pgs).
Kim & Rush, "Sequence-Level Knowledge Distillation," arXiv preprint, arXiv:1606.07947, 2016. (11 pgs).
Miao et al.,"Eesen: End-to-end speech recognition using deep RNN models and wfst-based decoding," In (ASRU), 2015 IEEE Workshop, 2015. (8 pgs).
Zhang et al.,"Very deep convolutional networks for End-to-End speech recognition," arXiv preprint, arXiv:1610.03022, 2016. (5 pgs).
Zweig et al.,"Advances in All-Neural Speech Recognition," arXiv preprint, arXiv:1609.05935, 2016,Retrieved from Internet < URL:https://arxiv.org/pdf/1609.05935v1.pdf> (5 pgs).
Povey et al.,"Purely sequence-trained neural networks for ASR based on lattice-free MMI," Submitted to Interspeech, 2016. (5 pgs).
Cartwright et al.,"Segmenting speech without a lexicon: The roles of phonotactics and speech source," arXiv preprint, cmplg/9412005, 1994. Retrieved from Internet< URL:https://arxiv.org/pdf/cmp-lg/9412005.pdf> (8 pgs).
Goldwater et al.,"Contextual dependencies in unsupervised word segmentation," In Proceedings of the 21st International Conference on Computational Linguistics and the 44th annual meeting of the Association for Computational Linguistics, pp. 673-680. Association for Computational Linguistics, 2006. (8 pgs).
Chorowski & Navdeep,"Towards better decoding and language model integration in sequence to sequence models," arXiv preprint, arXiv:1612.02695, 2016. Retrieved from Internet< URL:https://arxiv.org/pdf/1612.02695.pdf> (6 pgs).
K. Heafield et al., "Scalable modified Kneser-Ney language model estimation," In Proceedings of the 51st Annual Meeting of the Association for Computational Linguistics, Sofia, Bulgaria, 8 2013 (7pgs).
G. Hinton et al., "Deep neural networks for acoustic modeling in speech recognition," IEEE Signal Processing Magazine, 29(November):82-97, 2012 (27pgs).
S. Hochreiter et al., "Long short-term memory," Neural Computation, 9(8):1735-1780, 1997 (32pgs).

N. Jaitly et al.,"Vocal tract length perturbation (VTLP) improves speech recognition," In ICML Workshop on Deep Learning for Audio, Speech, and Language Processing, 2013, 5pp.
R. Jozefowicz et al., "An empirical exploration of recurrent network architectures," In ICML, 2015 (9pgs).
O. Kapralova et al., "A big data approach to acoustic model training corpus selection," In Interspeech, 2014 (5pgs).
K.Knowlton, "A fast storage allocator". Commun. ACM, 8(10):623-624, Oct. 1965 (3pgs).
T. Ko et al., Audio augmentation for speech recognition. In Interspeech, 2015 (4pgs).
A. Krizhevsky et al., "Imagenet classification with deep convolutional neural networks," In Advances in Neural Information Processing Systems 25, pp. 1106-1114, 2012 (9pgs).
R. Pascanu et al., "On the difficulty of training recurrent neural networks," abs/1211.5063, 2012, http://arxiv.org/abs/1211.5063 (9pgs).
P. Patarasuk et al., "Bandwidth optimal all-reduce algorithms for clusters of workstations," J. Parallel Distrib. Comput., 69(2):117-124, Feb. 2009 (24pgs).
R. Raina et al., "Large-scale deep unsupervised learning using graphics processors," In 26th International Conference on Machine Learning, 2009 (8pgs).
S. Renals et al., "Connectionist probability estimators in HMM speech recognition," IEEE Transactions on Speech and Audio Processing, 2(1):161-174, 1994 (13pgs).
T. Robinson et al., "The use of recurrent neural networks in continuous speech recognition," pp. 253-258, 1996 (26pgs).
T. Sainath et al., "Convolutional, long short-term memory, fully connected deep neural networks," In ICASSP, 2015 (5pgs).
T.N. Sainath et al, "Deep convolutional neural networks for LVCSR," In ICASSP, 2013 (5pgs).
H. Sak et al., "Fast and accurate recurrent neural network acoustic models for speech recognition," abs/1507.06947, 2015. http://arxiv.org/abs/1507.06947 (5pgs).
H. Sak et al., "Sequence discriminative distributed training of long shortterm memory recurrent neural networks," In Interspeech, 2014 (5pgs).
B. Sapp et al., "A fast data collection and augmentation procedure for object recognition," In AAAI Twenty-Third Conference on Artificial Intelligence, 2008 (7pgs).
Chilimbi et al., Project adam: Building an efficient and scalable deep learning training system. In USENIX Symposium on Operating Systems Design and Implementation,2014,13pg.
K. Cho et al., Learning phrase representations using rnn encoder-decoder for statistical machine translation. In EMNLP, 2014 (15pgs).
J. Chorowski et al., End-to-end continuous speech recognition using attention-based recurrent nn: First results. abs/1412.1602, 2015. http://arxiv.org/abs/1412.1602 (10pgs).
C. Cieri et al., The Fisher corpus: a resource for the next generations of speech-totext. In LREC, vol. 4, pp. 69-71, 2004 (3pgs).
A. Coates et al., "Text detection and character recognition in scene images with unsupervised feature learning," In International Conferenceon Document Analysis and Recognition, 2011 (6pgs).
A. Coates et al., "Deep learning with COTS HPC," In International Conference on Machine Learning, 2013 (9pgs).
G. Dahl et al., Large vocabulary continuous speech recognition with context-dependent DBN-HMMs. In Proc. ICASSP, 2011 (4pgs).
G. Dahl et al., "Context-dependent pre-trained deep neural networks for large vocabulary speech recognition," IEEE Transactions on Audio, Speech, and Language Processing, 2011 (13pgs).

* cited by examiner

SYSTEMS AND METHODS FOR TRACE NORM REGULARIZATION AND FASTER INFERENCE FOR EMBEDDED MODELS

CROSS-REFERENCE TO RELATED APPLICATION

This application claims the priority benefit under 35 USC § 119(e) to U.S. Prov. Pat. App. Ser. No. 62/576,470, filed on 24 Oct. 2017, entitled "SYSTEMS AND METHODS FOR TRACE NORM REGULARIZATION AND FASTER INFERENCE FOR EMBEDDED SPEECH RECOGNITION RNNS", and listing Markus Kliegl, Siddharth Goyal, Kexin Zhao, Kavya Srinet, and Mohammad Shoeybi as inventors. The aforementioned patent document is incorporated by reference herein in its entirety.

BACKGROUND

A. Technical Field

The present disclosure relates generally to systems and methods for computer learning that can provide improved computer performance, features, and uses in speech recognition and allow for better usage on systems with limited capabilities.

B. Background

Speech recognition is an inter-disciplinary field that develops methodologies and technologies that enables the recognition and translation of spoken language into text by computers. It incorporates knowledge and research in the linguistics, computer science, and electrical engineering fields.

The complexity, processing requirements, and the accuracy of a speech recognition system are affected by, among other things, the size of the system and the size of vocabulary involved in the system. Some applications only require a few words, while some others may require very large vocabulary. A continuous speech system operates on speech in which words are connected together. Consequently, it is more difficult to handle continuous speech. It is more challenging, compared to the scenario of isolated-word, to find the start and end points of words. The start and end of words are affected by the preceding and following words. The recognition of continuous speech is also affected by the rate of speech. Faster speech tends to be harder for recognition.

There is a desire to deploy machine learning applications, like speech recognition, on a number of devices and in a variety of settings. Preferably, to help deploy machine learning applications more broadly, it would be beneficial to use embedded applications on lower cost devices. However, given the typical processing, power, and/or memory constraints of such systems, it is extremely challenging to have applications provide good quality results. Compute limitations, memory limitations, and the like can dramatically affect latency, runtime, and final output quality.

Accordingly, what is needed are systems and methods that allow for more efficient storage model neural network components and more efficient computation of common operations used in neural networks.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
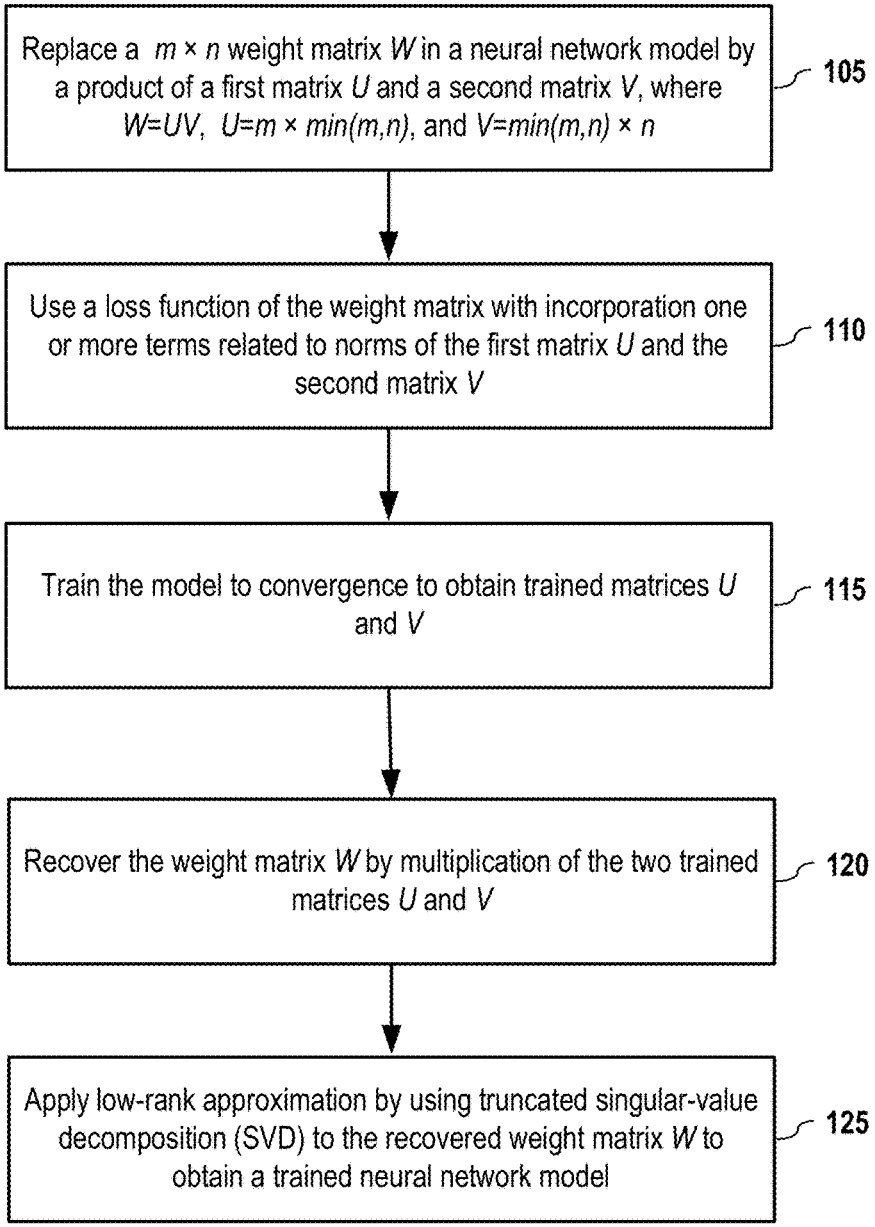
FIG. 1 depicts a process of training a neural network according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that experiments and results provided herein are provided by way of illustration and were performed under specific conditions using a specific embodiment or embodiments; accordingly, neither these experiments nor their results shall be used to limit the scope of the disclosure of the current patent document.

A. Introduction

For embedded applications of machine learning, it is desirable to seek models that are as accurate as possible given size and latency constraints at inference time. For many neural networks, the parameters and computation are concentrated in two basic building blocks:
1) Convolutions. These tend to dominate in, for example, image processing applications.
2) Dense matrix multiplications. General Matrix-Matrix Multiplications (GEMMs) as found, for example, inside fully connected layers or recurrent layers, such as Gated Recurrent Units (GRUs) and Long Short-Term Memory (LSTM). These are common in speech and natural language processing applications.

These two building blocks are natural targets for efforts to reduce parameters and speed up models for embedded applications. Much work on this topic already exists in the literature, and a brief overview is provided in Section B.

In this patent document, some embodiments focus on the second category with at least two contributions:
1) Trace norm regularization: This document describes embodiments of a trace norm regularization technique and an accompanying training methodology that enables the practical training of models with competitive accuracy versus number of parameter trade-offs. It automatically selects the rank and eliminates the need for any prior knowledge on suitable matrix rank.
2) Efficient kernels for inference: This document explores the importance of optimizing for low batch sizes in on-device inference, and kernels are introduced for ARM processors that vastly outperform publicly available kernels in the low-batch-size regime.

These two topics are explored in Sections C and D, respectively. Although experiments were conducted and results were reported in the context of large-vocabulary continuous speech recognition (LVCSR) on embedded devices, the ideas and techniques are broadly applicable to other deep learning networks. Work on compressing any neural network for which large GEMMs dominate the parameters or computation time can benefit from the insights presented in this patent document.

B. Some Related Work

The work in this document is related to that of Prabhavalkar et al. (*On the compression of recurrent neural networks with an application to LVCSR acoustic modeling for embedded speech recognition*, 2016 IEEE International Conference on Acoustics, Speech and Signal Processing (ICASSP), pp. 5970-5974, hereinafter "Prabhavalkar") (which is incorporated by reference herein in its entirety), where low-rank factored acoustic speech models are trained by warmstarting from a truncated singular value decomposition (SVD) of pre-trained weight matrices. This technique was also applied to speech recognition on mobile devices. In this document, a variational form of trace norm regularization is developed, and novel combinations of the variational trace norm regularization with a two-stage training technique are disclosed.

Low rank factorization of neural network weights in general has been the subject of many other works. Some other approaches to dense matrix compression include sparsity, hash-based parameter sharing, and other parameter-sharing schemes such as circulant, Toeplitz, or more generally low-displacement-rank matrices. Splitting activations into independent groups has also been explored. This is akin to using block-diagonal matrices.

C. Embodiments of Training Low Rank Models

Low rank factorization is a well-studied and effective technique for compressing large matrices. In Prabhavalkar, low-rank models are trained by first training a model with unfactored weight matrices (referred as stage 1), and then warmstarting a model with factored weight matrices from the truncated SVD of the unfactored model (referred as stage 2). The truncation is typically done by retaining only as many singular values as required to explain a specified percentage of the variance.

If the weight matrices from stage 1 had only a few nonzero singular values, then the truncated SVD used for warmstarting stage 2 would yield a much better or even error-free approximation of the stage 1 matrix. This suggests applying a sparsity-inducing $\ell^1$ penalty on the vector of singular values during stage 1 training. This is known as trace norm regularization in the literature. Unfortunately, there is no known way of directly computing the trace norm and its gradients that would be computationally feasible in the context of large deep learning models. Instead, embodiments presented herein combine the two-stage training method with a variational trace norm regularization technique. Embodiments of this technique are described with more details in Section C.1 and experimental results are reported in Section C.2.

1. Embodiments of Trace Norm Regularization

First some notations are introduced. $\|\cdot\|_\mathcal{T}$ denotes the trace norm of a matrix, that is, the sum of the singular values of the matrix. The trace norm is also referred to as the nuclear norm or the Schatten 1-norm in some literature. Furthermore, $\|\cdot\|_\mathcal{F}$, denoted as the Frobenius norm of a matrix, is defined as:

$$\|A\|_\mathcal{F} = \sqrt{Tr A A^*} = \sqrt{\Sigma_{i,j}|A_{ij}|^2} \qquad (1)$$

The Frobenius norm is identical to the Schatten 2-norm of a matrix, i.e. the $\ell^2$ norm of the singular value vector of the matrix. The following lemma provides a variational characterization of the trace norm in terms of the Frobenius norm.

Lemma 1. Let W be an m×n matrix and denote by a its vector of singular values. Then:

$$\|W\|_\mathcal{T} := \sum_{i=1}^{min(m,n)} \sigma_i(W) = \min \frac{1}{2}(\|U\|_\mathcal{F}^2 + \|V\|_\mathcal{F}^2) \qquad (2)$$

where the minimum is taken over all U:M×min(m,n) and V:min(m,n)×n such that W=UV. Furthermore, if $W=\tilde{U}\tilde{\Sigma}\tilde{V}^*$ is a singular value decomposition of W, then equality holds in (2) for the choice $U=\tilde{U}\sqrt{\tilde{\Sigma}}$ and $V=\sqrt{\tilde{\Sigma}}\tilde{V}^*$.

In one or more embodiments, a procedure to take advantage of this characterization is disclosed in the following. For each large GEMM in the model, replace the m×n weight matrix W by the product W=UV where U:m×min(m,n) and V:min(m,n)×n. Then use a loss function given by:

$$\ell(UV) + \frac{1}{2}\lambda(\|U\|_\mathcal{F}^2 + \|V\|_\mathcal{F}^2) \qquad (3)$$

where λ is a hyperparameter controlling the strength of the approximate trace norm regularization. Minimizing the loss equation (3) is equivalent to minimizing the actual trace norm regularized loss:

$$\ell(W) + \lambda\|W\|_\mathcal{T} \qquad (4)$$

Section C.2.1 shows empirically that use of the loss function (3) is indeed highly effective at reducing the trace norm of the weight matrices.

FIG. 1 depicts a process of training a neural network model, according to one or more embodiments of the present document.

Stage 1
For each large GEMM in a recurrent neural network model, replace (105) the m×n weight matrix W by the product of a first matrix U and a second matrix V, where W=UV, U:m×min(m,n) and V:min(m,n)×n. The recurrent neural network model has a first parameter (or model) size requiring a first memory space for implementation.

Use (110) a loss function (instead of using $\ell(W)$), the loss function incorporates at least one term related norms (e.g. Frobenius norms) of the first matrix U and the second matrix V, the loss function may be expressed as:

$$\ell(UV) + \frac{1}{2}\lambda(\|U\|_\mathcal{F}^2 + \|V\|_\mathcal{F}^2) \qquad (5)$$

where λ is a hyperparameter controlling the strength of the trace norm regularization.

Train (115) the model to convergence to obtain trained first matrix U and second matrices V.

Stage 2
For the trained model from stage 1, recover (120) W by multiplying the two trained matrices U and V.

Apply (125) low-rank approximation by using truncated singular-value decomposition (SVD) to the recovered weight matrix W, e.g. warmstarted from the truncated SVD of W, to obtain a trained recurrent neural network model. The recurrent neural network model trained with low-rank approximation is output a trained recurrent network model, which has a second parameter size less than the first parameter size, and thus requiring a second memory space less than the first memory space for implementation. Such reduced memory space requirement is especially advantageous in embedded application where the memory and computation resources are limited. It is also desirable to lower memory and computation requirements of the recurrent network model for applicability without sacrificing the performance. In one or more embodiments, the trained recurrent network model has a trade-off in accuracy within a threshold with reference to the recurrent network model before training. In one or more embodiments, the accuracy is word error rate (WER), character error rate (CER), or a combination thereof, in speech recognition verified with one or more training data set. The threshold may be a predetermined relative percentage of CER or WER, e.g. 10%, with reference to untrained model. By varying the number of singular values retained, the parameter versus accuracy trade-off may be tuned. In one or more embodiments, the trained recurrent network model may even has a higher accuracy compared to the recurrent network model before training, which may be due to concentration on relatively more important parameters and/or elimination of interference from those parameters with less importance.

One modified embodiment to this is described in Section C.2.3, where it is shown that training the stage 1 model to convergence is not required before switching to stage 2. By making the transition earlier, training time can be substantially reduced.

2. Some Experiments and Results

In this section, the results of experiments related to trace norm regularization are reported. The baseline model is a forward-only Deep Speech 2 model embodiment (which is described in commonly-owned U.S. patent application Ser. No. 15/358,102, filed on 21 Nov. 2016, entitled "END-TO-END SPEECH RECOGNITION," and commonly-owned U.S. patent application Ser. No. 15/358,083, filed on 21 Nov. 2016, entitled "DEPLOYED END-TO-END SPEECH RECOGNITION"), each document is incorporated by reference herein in its entirety and for all purposes) with some small modifications such as growing GRU dimensions. More details are given in Section F. The model is trained and evaluated on the widely used Wall Street Journal (WSJ) speech corpus.

In one or more embodiments of the present disclosure, the parameters and computation of the model used are dominated by three GRU layers and a fully connected layer. It is these four layers that are compressed through low-rank factorization. As described in Section F.2, in embodiments of factorization scheme, each GRU layer involves two matrix multiplications: a recurrent and a non-recurrent one. For a simple recurrent layer, we would write:

$$h_t = f(W_{nonrec} x_t + W_{rec} h_{t-1}) \quad (6)$$

For a GRU layer, there are also weights for reset and update gates, which are grouped with the recurrent matrix. Details and the motivation for this split may be seen in Section F.2.

Since one focus here is on compressing acoustic models and not language models, the reported error metric is the character error rate (CER) rather than word error rate (WER). As the size and latency constraints vary widely across devices, whenever possible various techniques are compared by comparing their accuracy versus number of parameter trade-off curves. All CERs reported here were computed on a validation set separate from the training set.

2.1 Stage 1 Experiments

In this section, the effects of training with the loss function in equation (3) are investigated. For simplicity, this is referred to as trace norm regularization.

As the WSJ corpus is relatively small at around 80 hours of speech, models tend to benefit substantially from regularization. To make comparisons fairer, unfactored models were also trained with an $\ell^2$ regularization term and the hyperparameter space was searched just as exhaustively.

Figure 2:
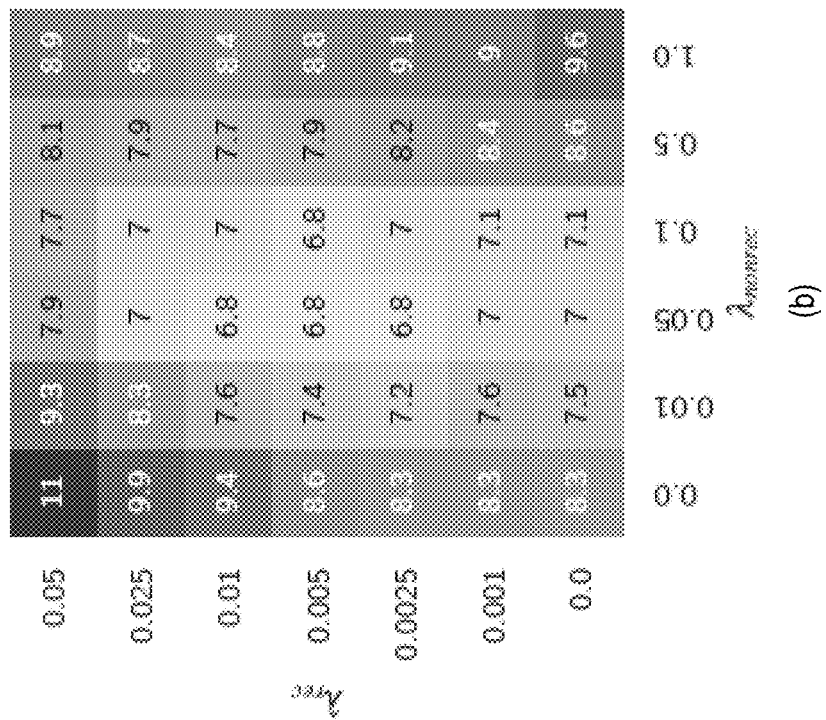
FIG. 2 depicts character error rate (CER) dependence on $\lambda_{rec}$ and $\lambda_{nonrec}$ for trace norm regularization (a) and $\ell^2$ regularization (b), according to embodiments of the present disclosure.
Figure 2:
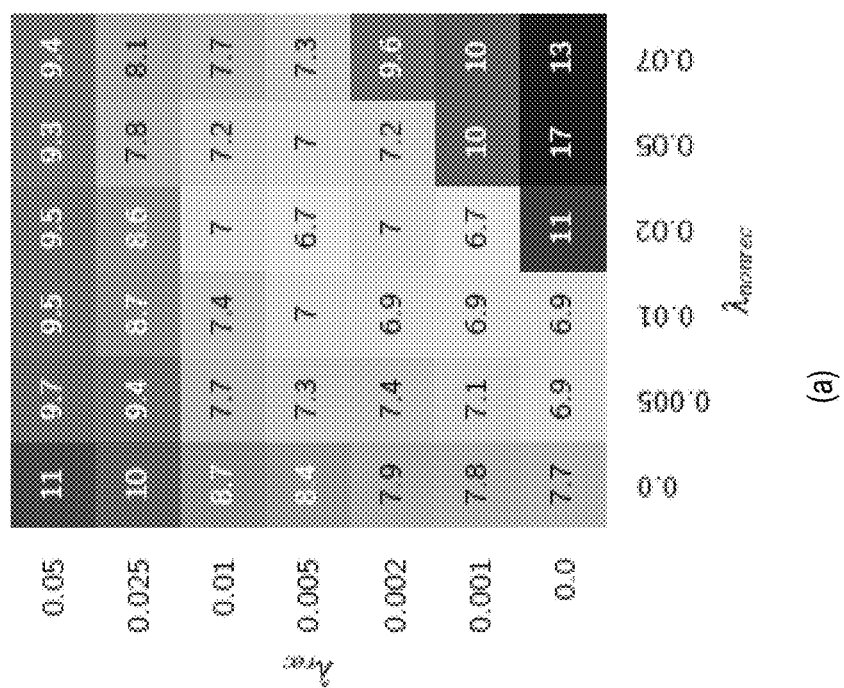

In one or more embodiments, for both trace norm and $\ell^2$ regularization, separate $\lambda_{rec}$ and $\lambda_{nonrec}$ parameters are introduced for determining the strength of regularization for the recurrent and non-recurrent weight matrices respectively. In addition to $\lambda_{rec}$ and $\lambda_{nonrec}$ in initial experiments, the learning rate is also roughly tuned. Since the same learning rate was found to be optimal for nearly all experiments, it was used for all the experiments reported in this section. The dependence of final CER on $\lambda_{rec}$ and $\lambda_{nonrec}$ is shown in FIG. 2, with chart (a) in FIG. 2 showing CER dependence for CER dependence and chart (b) in FIG. 2 showing CER dependence for $\ell^2$ regularization. Separate $\lambda_{rec}$ and $\lambda_{nonrec}$ values are seen to help for both trace norm and $\ell^2$ regularization. However, for trace norm regularization, it appears better to fix $\lambda_{rec}$ as a multiple of $\lambda_{nonrec}$ rather than tuning the two parameters independently.

One of the first questions of interest is whether the loss function (3) is effective at reducing the trace norm. As the interest is in the relative concentration of singular values rather than their absolute magnitudes, the following non-dimensional metric was introduced.

Definition 1. Let W be a nonzero m×n matrix with $d = \min(m,n) \geq 2$. Denote by $\sigma$ the d-dimensional vector of singular values of W. Then, the nondimensional trace norm coefficient of W may be defined as follows:

$$v(W) := \frac{\frac{\|\sigma\|_{\ell^1}}{\|\sigma\|_{\ell^2}} - 1}{\sqrt{d} - 1} \quad (7)$$

It is shown in Section E that $v$ is scale-invariant and ranges from 0 for rank 1 matrices to 1 for maximal-rank matrices with all singular values equal. Roughly speaking, the smaller $v(W)$, the better W can be approximated by a low-rank matrix.

Figure 3:
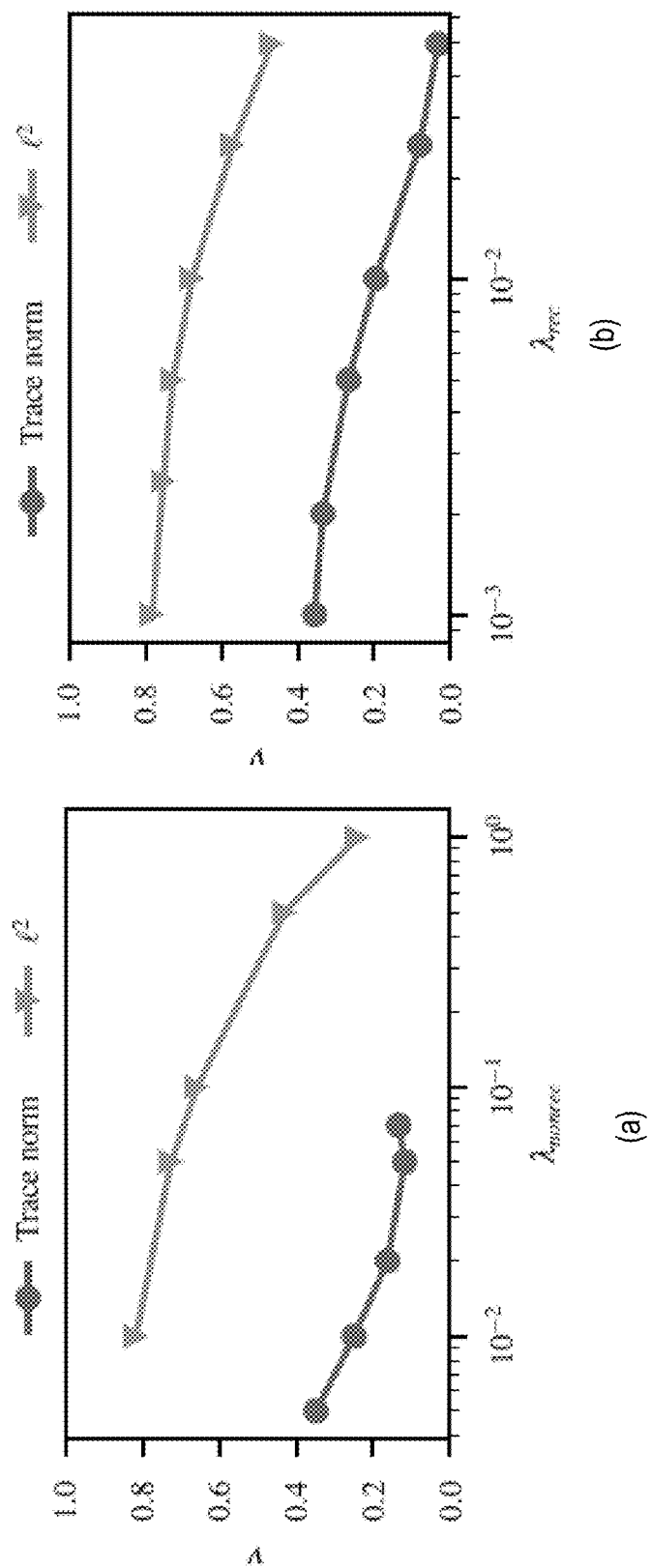
FIG. 3 depicts non-dimensional trace norm coefficient versus strength of regularization by type of regularization used during training, according to embodiments of the present disclosure.

As shown in FIG. 3, trace norm regularization is indeed highly effective at reducing the non-dimensional trace norm coefficient compared to $\ell^2$ regularization, according to embodiments of the present document. Graph (a) in FIG. 3 shows the results for the non-recurrent weight of the third GRU layer, with $\lambda_{rec} = 0$, according to embodiments of the present disclosure. Graph (b) in FIG. 3 shows results for the recurrent weight of the third GRU layer, with $\lambda_{nonrec} = 0$, according to embodiments of the present disclosure. The plots for the other weights are similar. At very high regularization strengths, $\ell^2$ regularization also leads to small $v$ values. However, from FIG. 2, it is apparent that this comes at the expense of relatively high CERs.

Figure 4:
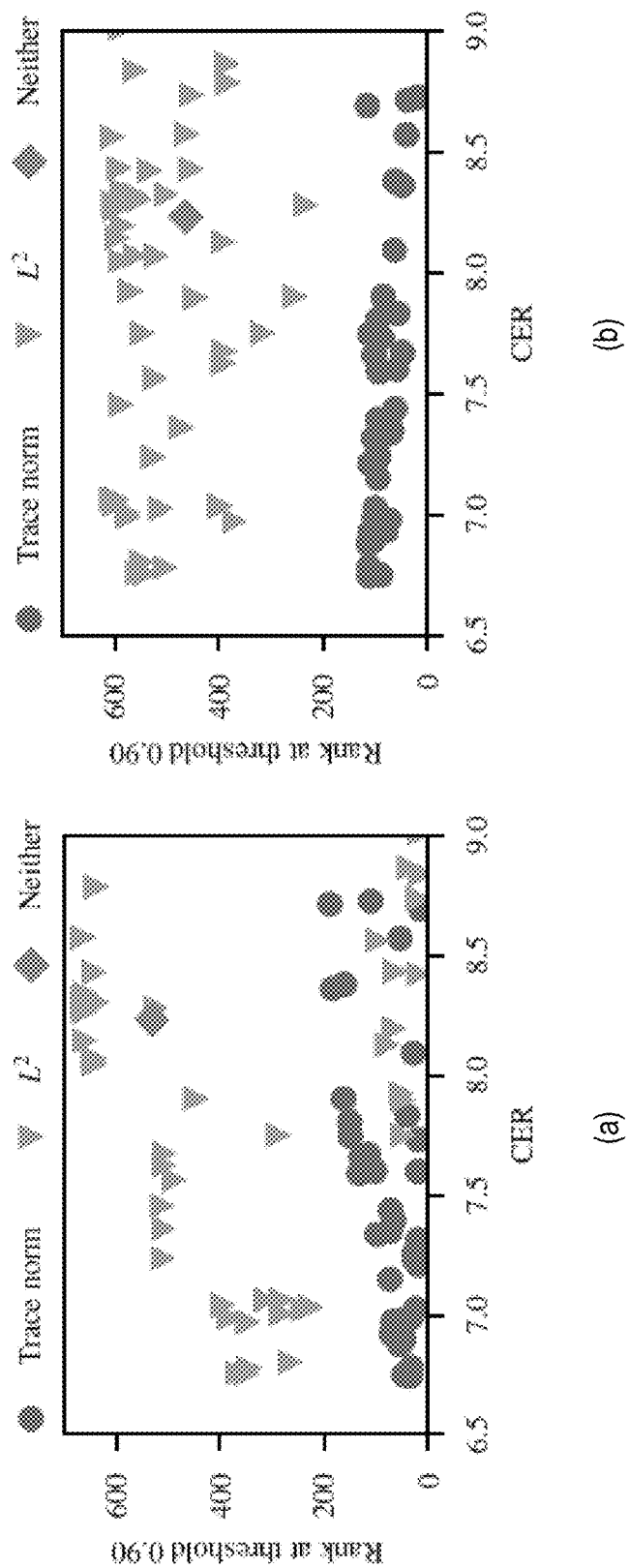
FIG. 4 depicts truncated singular value decomposition (SVD) rank required to explain 90% of the variance of the weight matrix versus CER by type of regularization used during training, according to embodiments of the present disclosure.

As shown in FIG. 4, this translates into requiring a much lower rank for the truncated SVD to explain, say, 90% of the variance of the weight matrix for a given CER. Shown here are results for the non-recurrent (Graph (a) in FIG. 4) and recurrent (Graph (b) in FIG. 4) weights of the third GRU layer, according to embodiments of the present disclosure. The plots for the other weights are similar. Although a few $\ell^2$-regularized models occasionally achieve low rank, this is observed only at relatively high CER's and only for some of the weights. It is also noted that some form of regularization is very important on this dataset. The unregularized baseline model (the diamond shape points in FIG. 4) achieves relatively low CER.

2.2 Stage 2 Experiments

In this section, results of stage 2 experiments warmstarted from either trace norm or $\ell^2$ regularized stage 1 models are reported.

For each regularization type, the three best stage 1 models (in terms of final CER: all were below 6.8) were taken and the truncated SVD of their weights was used to initialize the weights of stage 2 models. By varying the threshold of variance explained for the SVD truncation, each stage 1 model resulted into multiple stage 2 models. In one or more embodiments, the stage 2 models were trained without regularization (i.e., $\lambda_{rec} = \lambda_{nonrec} = 0$) and with the initial learning rate set to three times the final learning rate of the stage 1 model.

Figure 5:
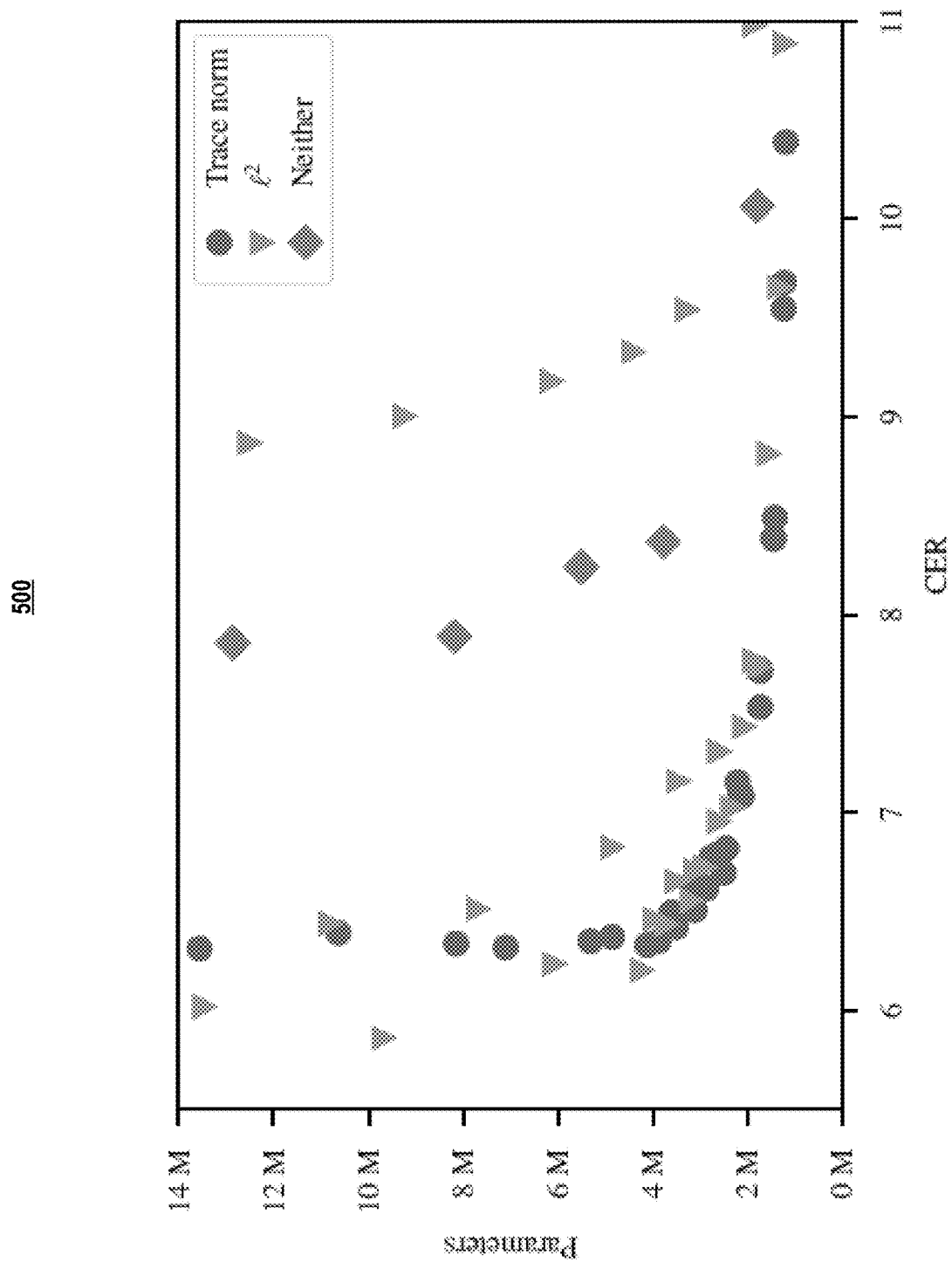
FIG. 5 depicts the number of parameters versus CER of stage 2 models identified by the type of regularization used for training the stage 1 model, according to embodiments of the present disclosure.

FIG. 5 shows number of parameters versus CER of stage 2 models noted by the type of regularization used for training the stage 1 model, according to embodiments of the present disclosure. As shown in FIG. 5, the best models from either trace norm or $\ell^2$ regularization exhibit similar accuracy versus number of parameter trade-offs. For comparison, some stage 2 models were also warmstarted from an unregularized stage 1 model. These models are seen to have significantly lower accuracies, accentuating the need for regularization on the WSJ corpus.

2.3 Reduced Training Time

In the previous sections, the stage 1 models were trained for 40 epochs to full convergence and then the stage 2 models were trained for another 40 epochs, again to full convergence. Since the stage 2 models are drastically smaller than the stage 1 models, it takes less time to train them. Hence, shifting the stage 1 to stage 2 transition point to an earlier epoch could substantially reduce training time. This section shows that it is indeed possible to do so without hurting final accuracy.

Specifically, the stage 1 trace norm and $\ell^2$ models from Section C.2.1 that resulted in the best stage 2 models in Section C.2.2 are taken. In those sections, the interests are in the parameters versus accuracy trade-off and each stage 1 model was used to warmstart a number of stage 2 models of different sizes. Instead, this section sets a fixed target of 3 M parameters and a fixed overall training budget of 80 epochs but varies the stage 1 to stage 2 transition epoch. In one or more embodiments, for each of the stage 2 runs, the learning rate, a hyper-parameter to tune neural networks training to define how quickly or how slowly to update network parameters, is initialized with the learning rate of the stage 1 model at the transition epoch (the last epoch in training the stage 1 model). Therefore, the learning rate follows the same schedule as if a single model had been trained for 80 epochs. As before, all regularization is disabled for stage 2.

In one or more embodiments, the $\ell^2$ stage 1 model has 21.7 M parameters, whereas the trace norm stage 1 model at 29.8 M parameters is slightly larger due to the factorization. Since the stage 2 models have roughly 3 M parameters and the training time is approximately proportional to the number of parameters, stage 2 models train about 7× and 10× faster, respectively, than the $\ell^2$ and trace norm stage 1 models. Consequently, large overall training time reductions can be achieved by reducing the number of epochs spent in stage 1 for both $\ell^2$ and trace norm.

Figure 6:
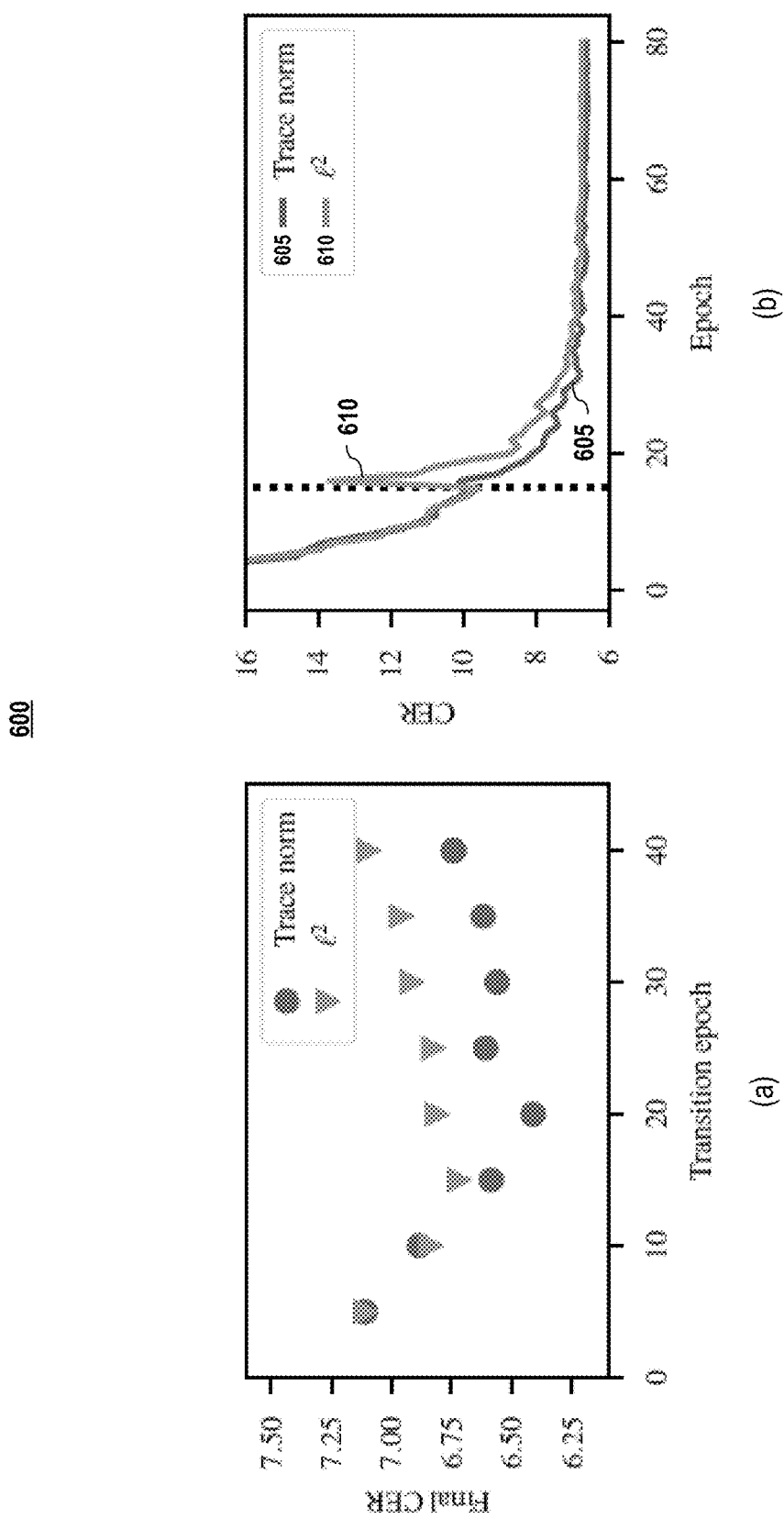
FIG. 6 depicts CER versus transition epoch with different types of regularization used for training stage 1 model, and depicts CER as training progresses identified by the type of regularization used in stage 1, according to embodiments of the present disclosure.

The results are shown in FIG. 6. Graph (a) in FIG. 6 shows CER versus transition epoch, noted by the type of regularization used for training the stage 1 model. Graph (b) in FIG. 6 shows CER as training progresses noted by trace norm regularization (605) and $\ell^2$ regularization (610) used in stage 1. The dotted line indicates the transition epoch. Based on Graph (a) in FIG. 6, it is evident that the transition epoch number can be lowered without hurting the final CER. In some cases, marginal CER improvements can be even observed. For transition epochs of at least 15, slightly better results were also observed for trace norm than $\ell^2$ regularization. In the right panel, the convergence of CER is plotted when the transition epoch is 15. It is found that the trace norm model's CER is barely impacted by the transition whereas the $\ell^2$ models see a huge jump in CER at the transition epoch. Furthermore, the plot suggests that a total of 60 epochs may have sufficed. However, the savings from reducing stage 2 epochs are negligible compared to the savings from reducing the transition epoch.

D. Application to Production-Grade Embedded Speech Recognition

With low rank factorization techniques similar to those described in Section C, large vocabulary continuous speech recognition (LVCSR) models were able to be trained with acceptable numbers of parameters and acceptable loss of accuracy compared to a production server model (baseline). One or more embodiments for faster inference disclosed in Section D may be independent from the trace norm regularization disclosed in Section C. Due to long training cycles for the 10,000+ hours of speech used in this section, pre-trained models are used in this section. However, the techniques in this section are entirely agnostic to such differences. Table 1 shows the baseline along with three different compressed models with much lower number of parameters. The tier-3 model employs the techniques of Sections F.4 and F.3. Consequently, it runs significantly faster than the tier-1 model, even though they have a similar number of parameters. Unfortunately, this comes at the expense of some loss in accuracy.

TABLE 1

WER of three tiers of low rank speech recognition models and a production server model on an internal test set. This table illustrates the effect of shrinking just the acoustic model. The same large server-grade language model was used for all rows.

| Model | Parameters (M) | WER | % Relative |
|---|---|---|---|
| baseline | 115.5 | 8.78 | 0.0% |
| tier-1 | 14.9 | 9.25 | −5.4% |
| tier-2 | 10.9 | 9.80 | −11.6% |
| tier-3 | *14.7 | 9.92 | −13.0% |

*The tier-3 model is larger but faster than the tier-2 model. See the specification for details Although low rank factorization significantly reduces the overall computational complexity of the presented LVCSR system, further optimization is still required to achieve real-time inference on mobile or embedded devices. One approach to speeding up the network is to use low-precision 8-bit integer representations for weight matrices and matrix multiplications (the GEMM operation in BLAS terminology). This type of quantization reduces both memory as well as computation requirements of the network while only introducing 2% to 4% relative increase in WER.

In one or more embodiments, to perform low precision matrix multiplications, the gemmlowp library was originally used, which provides state-of-the-art low precision GEMMs using unsigned 8-bit integer values. However, gemmlowp's approach is not efficient for small batch sizes. One presented application, LVCSR on embedded devices with single user, is dominated by low batch size GEMMs due to the sequential nature of recurrent layers and latency constraints. This can be demonstrated by looking at a simple RNN cell which has the form:

$$h_t = f(Wx_t + Uh_{t-1}) \qquad (8)$$

This cell contains two main GEMMs: The first, $Uh_{t-1}$, is sequential and requires a GEMM with batch size 1. The second, $Wx_t$, can in principle be performed at higher batch sizes by batching across time. However, choosing too large batch sizes can significantly delay the output, as the system needs to wait for more future context. In practice, it was found that batch sizes higher than around 4 resulted in too high latencies, negatively impacting user experience.

In one or more of the tests, custom assembly kernels were implemented for the 64-bit ARM architecture (AArch64, also known as ARMv8 or ARM64) to further improve the performance of the GEMMs operations. The aforementioned strategies and methods in trace norm regularization may also be applicable in custom assembly kernels implementations.

Figure 7:
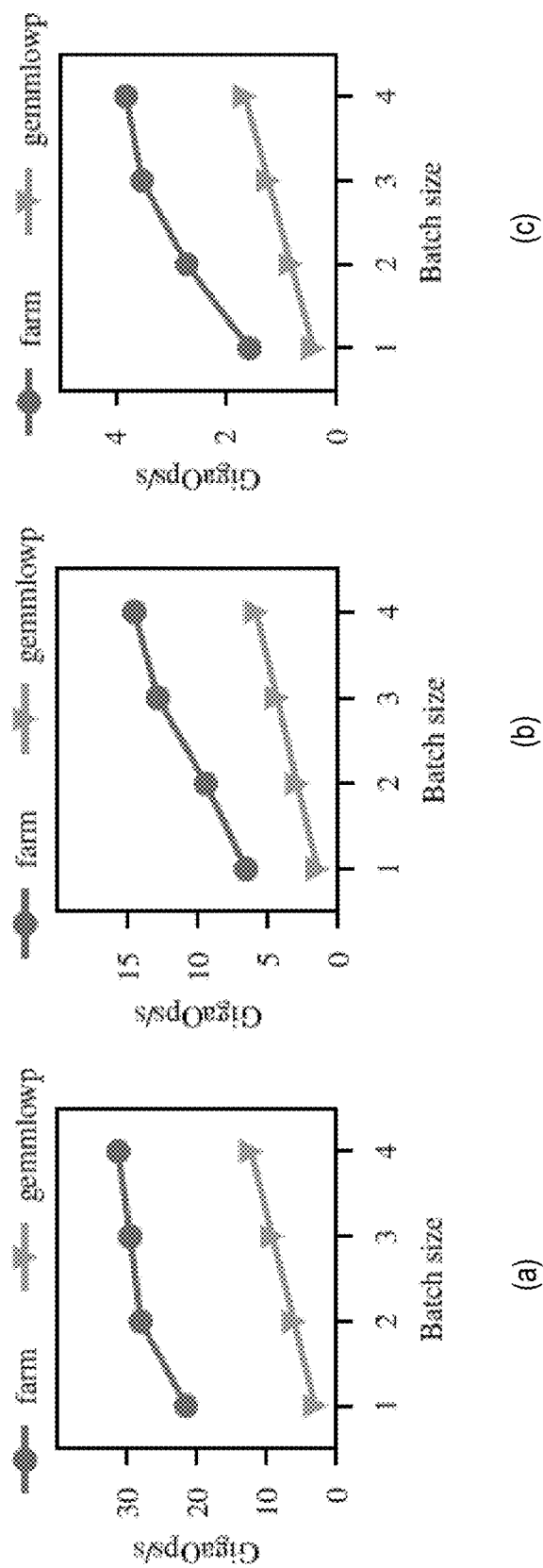
FIG. 7 depicts comparison of kernels (farm) and the gemmlowp library for matrix multiplication on various devices, according to embodiments of the present disclosure.

FIG. 7 compares the performance of an implementation embodiment (denoted by farm) with the gemmlowp library for matrix multiplication on iPhone 7 (Graph (a) in FIG. 7), iPhone 6 (Graph (b) in FIG. 7), and Raspberry Pi 3 Model B (Graph (c) in FIG. 7). The benchmark computes Ax=b where A is a random matrix with dimension 6144×320, and x is a random matrix with dimension 320× batch-size. All matrices are in unsigned 8-bit integer format. The farm kernels are significantly faster than their gemmlowp counterparts for batch sizes 1 to 4. The peak single-core theoretical performance for iPhone 7, iPhone 6, and Raspberry Pi 3 are 56.16, 22.4 and 9.6 Giga Operations per Second, respectively. The gap between the theoretical and achieved values is mostly due to kernels being limited by memory bandwidth.

In addition to low precision representation and customized ARM kernels, other approaches are explored to speed up the LVCSR system. These techniques are described in Section F.

Finally, by combining low rank factorization, some techniques from Section F, int8 quantization, and the farm kernels, as well as using smaller language models, a range of speech recognition models suitably tailored to various devices may be created. These are shown in Table 2.

TABLE 2

Embedded speech recognition models.

| Device | Acoustic model | Language model size (MB) | WER | % Relative | Speedup over real-time | % time spent in acoustic model |
|---|---|---|---|---|---|---|
| GPU server | baseline | 13,764 | 8.78 | 0.0% | 10.39x | 70.8% |
| iPhone 7 | tier-1 | 56 | 10.50 | −19.6% | 2.21x | 65.2% |
| iPhone 6 | tier-2 | 32 | 11.19 | −27.4% | 1.13x | 75.5% |
| Raspberry Pi 3 | tier-3 | 14 | 12.08 | −37.6% | 1.08x | 86.3% |

E. Nondimensional Trace Norm Coefficient

In this section, some of the properties of the non-dimensional trace norm coefficient defined in Section C.1 are described.

Proposition 1. Let W, d, σ be as in Definition 1, then
(i) $v(cW)=v(W)$ for all scalars $c \in \mathbb{R} \setminus \{0\}$.
(ii) $0 \leq v(W) \leq 1$.
(iii) $v(W)=0$ if and only if W has rank 1.
(iv) $v(W)=1$ if and only if W has maximal rank and all singular values are equal.

Proof. Since W is assumed to be nonzero, at least one singular value is nonzero and hence $\|\sigma\|_{\ell^2} \neq 0$. Property (i) is immediate from the scaling property $\|c\sigma\|=|c|\cdot\|\sigma\|$ satisfied by all norms.

To establish the other properties, observe that $$(\sigma_i + \sigma_j)^2 \geq \sigma_i^2 + \sigma_j^2 \geq 2\left(\frac{1}{2}\sigma_i + \frac{1}{2}\sigma_j\right)^2 \quad (9)$$

The first inequality holds since singular values are non-negative, and the inequality is strict unless $\sigma_i$ or $\sigma_j$ vanishes. The second inequality comes from an application of Jensen's inequality and is strict unless $\sigma_i = \sigma_j$. Thus, replacing $(\sigma_i, \sigma_j)$ by $(\sigma_i + \sigma_j, 0)$ preserves $\|\sigma\|_{\ell^1}$ while increasing $\|\sigma\|_{\ell^2}$ unless one or $\sigma_i$ or $\sigma_j$ is zero. Similarly, replacing $(\sigma_i, \sigma_j)$ by $$\left(\frac{1}{2}\sigma_i + \frac{1}{2}\sigma_j, \frac{1}{2}\sigma_i + \frac{1}{2}\sigma_j\right)$$

preserves $\|\sigma\|_{\ell^1}$ while decreasing $\|\sigma\|_{\ell^2}$ unless $\sigma_i = \sigma_j$. By a simple argument by contradiction, it follows that the minima occur for $\sigma = (\sigma_1, 0, \ldots, 0)$, in which case $v(W)=0$ and the maxima occur for $\sigma = (\sigma_1, \ldots, \sigma_1)$, in which case $v(W)=1$.

Figure 8:
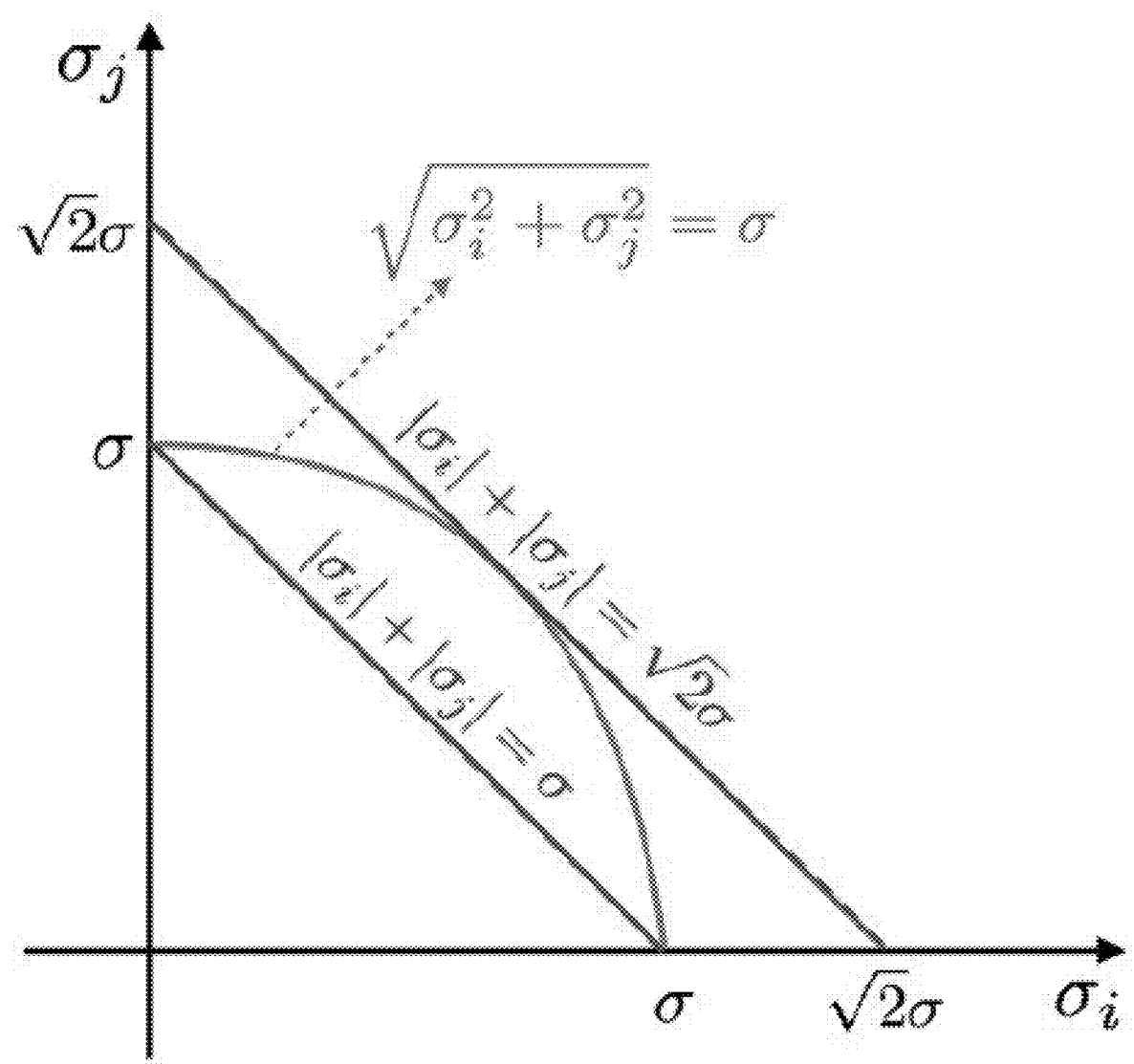
FIG. 8 graphically illustrates contours of $\|\sigma\|_{\ell^1}$ and $\|\sigma\|_{\ell^2}$, according to embodiments of the present disclosure.

In one or more embodiments, a better intuition can also be obtained about the minimum and maximum of $v(W)$ by looking at the 2D case visualized in FIG. 8. In FIG. 8, $\|\sigma\|_{\ell^2}$ is kept constant to σ, $\|\sigma\|_{\ell^1}$ can vary from σ to $\sqrt{2}\sigma$. The minimum $\|\sigma\|_{\ell^1}$ happens when either $\sigma_i$ or $\sigma_j$ are zero. For these values $\|\sigma\|_{\ell^1} = \|\sigma\|_{\ell^2}$ and as a result $v(W)=0$. Similarly, the maximum $\|\sigma\|_{\ell^1}$ happens for $\sigma_i = \sigma_j$, resulting in $v(W)=1$.

F. Embodiments of Model Design Considerations

In this Section, a few preliminary insights, which informed the choice of baseline model for the experiments reported in Sections C and D, are described.

Since the target domain is on-device streaming speech recognition with low latency, a focus was chosen on Deep Speech 2-like model embodiments with forward-only GRU layers.

1. Growing Recurrent Layer Sizes

Across several data sets and model architectures, it was consistently found that the sizes of the recurrent layers closer to the input could be shrunk without affecting accuracy much. A related phenomenon was observed in Prabhavalkar: When doing low-rank approximations of the acoustic model layers using SVD, the rank required to explain a fixed threshold of explained variance grows with distance from the input layer. Some SVD thresholding details are given in the Section F.1.1 below.

In one or more embodiments, to reduce the number of parameters of the baseline model and speed up experiments, growing GRU dimensions are adopted. Since the compression techniques presented herein will automatically reduce layers to a near-optimal size, these dimensions were not tuned, but a reasonable affine increasing scheme of 768, 1024, 1280 for the GRU dimensions was picked, and dimension 1536 for the final fully connected layer was picked.

1.1 Embodiments of SVD Thresholding

Let M be a model several of whose parameters are in the form of large matrices:

$W_1: m_1 \times n_1$ $W_2: m_2 \times n_2$

...

$W_k: m_k \times n_k$

Denoting the total number of other parameters of the model M by S, then the total number of parameters of the model M is:

$$\text{size}(M) = m_1 \times n_1 + m_2 \times n_2 + \ldots + m_k \times n_k + S \quad (10)$$

For low-rank factorization, each matrix $W_i$ is replaced by the product $U_i V_i$ of dimensions $U_i: m_i \times r_i$ $U_i: r_i \times n_i$ Denote the model with these replacements made by L, then the total number of parameters of the model L is:

$$size(L) = (m_1+n_1) \times r_1 + (m_2+n_2) \times r_2 + \ldots + (m_k+n_k) \times r_k + S \quad (11)$$

By varying the rank $r_i \geq 1$, the model size may be varied. The smallest model size that can be achieved (by taking $r_i=1$ or all i) is:

$$Minsize(L) = m_1 + \ldots + m_k + n_1 + \ldots + n_k + S \quad (12)$$

Using SVD Thresholding to Achieve a Particular Model Size

Figure 9:
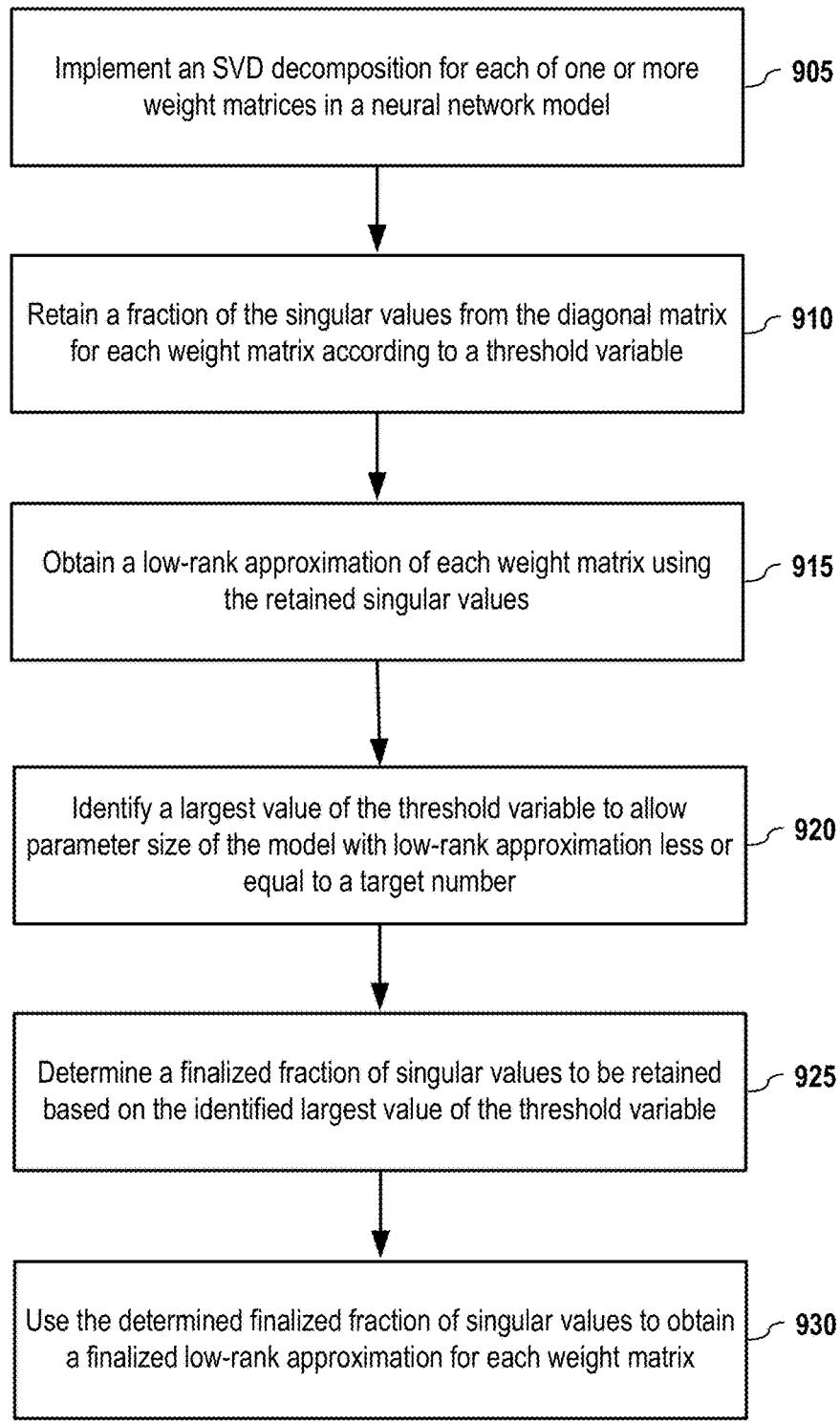
FIG. 9 depicts a process of using SVD thresholding to achieve a desired model size according to embodiments of the present disclosure.

FIG. 9 depicts a process of using SVD thresholding to achieve a desired model size according to one or more embodiments of the present disclosure. With inputs of a model M as above with already trained weights (a trained stage 1 model, in the nomenclature of the paper) and a target final number of parameters P that is at least as large as in equation (11), the goal is to output a low-rank model L as above with size(L) set as P. In one or more embodiments, the processes to achieve the goal are shown below:

For each weight $W_i$ of one or more weight matrix in a neural network model, an SVD decomposition $W_i = A_i \Sigma_i B_i$ is implemented (905), wherein $A_i$ is a $m_i \times m_i$ unitary matrix (referred a left unitary matrix), $B_i$ is a $n_i \times n_i$ unitary matrix (referred a right unitary matrix), $\Sigma_i$ is a $m_i \times n_i$ rectangular diagonal matrix with non-negative real numbers on the diagonal. The singular values are denoted by $s_1 \geq s_2 \geq \ldots s_q \geq 0$, where $q = \min(m_i, n_i)$.

Given a threshold variable T, a low-rank approximation $U_i(T)V_i(T)$ of $W_i$ is obtained by:

Find the rank $r_i$ such that a fraction of the variance of $W_i$ is retained (910) by the $r_i$ largest singular values (for example, if T=0.90, then it is said "90% of the variance of $W_i$ is retained"). Specifically, $r_i$ is taken to be the smallest integer greater than or equal to 1 such that $$\frac{\sum_{p=1}^{r_i} w_p^2}{\sum_{p=1}^{q} s_p^2} \geq T \quad (13)$$

Take $U_i(T) = A_i[1, \ldots, r_i]\sqrt{\Sigma_i[1,\ldots,r_i]}$ and $V_i(T) = \sqrt{\Sigma_i[1,\ldots,r_i]} B_i[1, \ldots, r_i]$ where $A_i[1, \ldots, r_i]$ denotes the matrix consisting of only the first $r_i$ columns of $A_i$, and $B_i[1, \ldots, r_i]$ denotes the matrix consisting of only the first $r_i$ rows of $B_i$. A low-rank approximation of $W_i$ is obtained (915) by $U_i(T)V_i(T)$ using the retained singular values.

Denote the model with low-rank approximation obtained according to threshold T by L(T).

Then finally the largest T* is picked (920) such that size(L(T*))≤P. Based on the picked largest T*, the finalized fraction of singular values to be retained is determined (925). Using the finalized retained singular values, a finalized low-rank approximation for $W_i$ is obtained (930). The model L(T*) with the finalized low-rank approximation is used as the trained model or the output of this process (and is used to initialize the weights of stage 2 models, in the nomenclature of the paper).

2. Embodiments of Parameter Sharing in the Low-Rank Factorization

In one or more embodiments, the Gated Recurrent Unit (GRU) architecture is employed for the recurrent layers, where the hidden state $h_t$ is computed as follows:

$$z_t = \sigma(W_z x_t + U_z h_{t-1} + b_z)$$

$$r_t = \sigma(W_r x_t + U_r h_{t-1} + b_r)$$

$$\tilde{h}_t = f(W_h x_t + r_t \cdot U_h h_{t-1} + b_h)$$

$$h_t = (1 - z_t) \cdot h_{t-1} + z_t \tilde{h}_t \quad (14)$$

where $\sigma$ is the sigmoid function, z and r are update and reset gates respectively, $U_z$, $U_r$, $U_h$ are the three recurrent weight matrices, and $W_z$, $W_r$, $W_h$ are the three non-recurrent weight matrices.

Figure 10:
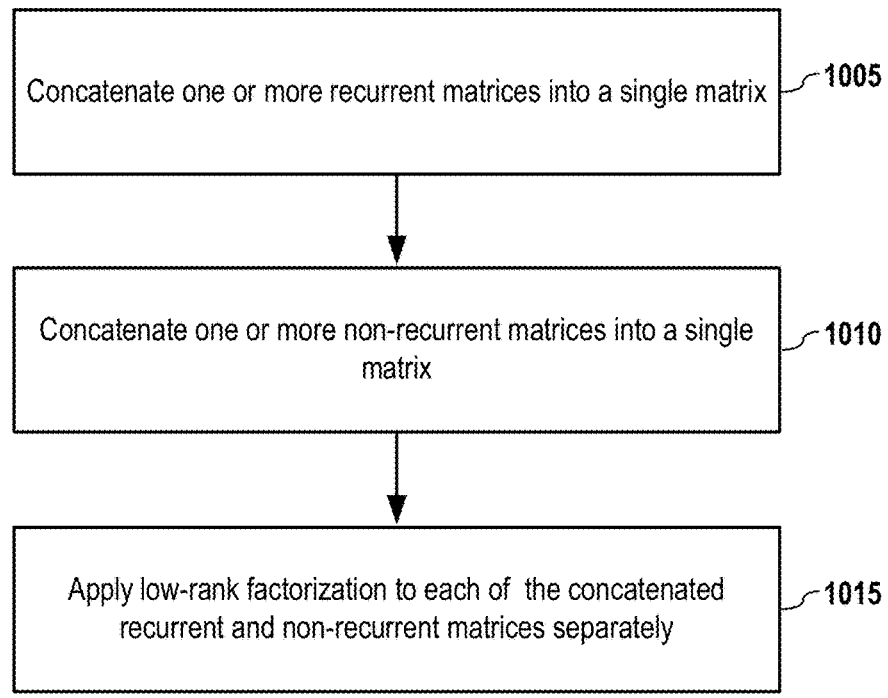
FIG. 10 depicts a process for parameter sharing using Low-Rank Factorization according to embodiments of the present disclosure.

In one or more embodiments, three ways of performing weight sharing are considered when doing low rank factorization of the 6 weight matrices:

1. Completely joint factorization. Here the 6 weight matrices are concatenated along the first dimension and apply low-rank factorization to this single combined matrix.
2. Partially joint factorization. FIG. 10 depicts a process for parameter sharing in Low-Rank Factorization, according to embodiments of the present document. Here the 3 recurrent matrices are concatenated (1005) into a single matrix U and likewise concatenate (1010) the 3 non-recurrent matrices into a single matrix W. Low-rank factorization is then applied (1015) to each of U and W separately.
3. Completely split factorization. Here low-rank factorization is applied to each of the 6 weight matrices separately.

Some have opted for the LSTM analog of completely joint factorization, as this choice has the most parameter sharing and thus the highest potential for compression of the model. However, in one or more embodiments of the present disclosure, partially joint factorization was used instead, largely for two reasons. First, in pilot experiments, it was found that the U and W matrices behave qualitatively quite differently during training. For example, on large data sets the W matrices may be trained from scratch in factored form, whereas factored U matrices need to be either warmstarted via SVD from a trained unfactored model or trained with a significantly lowered learning rate. Second, the U and W split is advantageous in terms of computational efficiency. For the non-recurrent W GEMM, there is no sequential time dependency and thus its inputs x may be batched across time.

Finally, the partially joint factorization was compared to the completely split factorization, and it was found that the former indeed led to better accuracy versus number of parameters trade-offs. Some results from this experiment are shown in Table 3.

While aspects of the present invention are described by way of example with reference to gated recurrent units (GRUs), one skilled in the art could readily apply these aspects to other types of recurrent neural networks, such as (by way of example and not limitation) plain RNNs or LSTMs.

TABLE 3

Performance of completely split versus partially joint factorization of recurrent weights

| | Completely split | | Partially joint | |
|---|---|---|---|---|
| SVD threshold | Parameters (M) | CER | Parameters (M) | CER |
| 0.50 | 6.3 | 10.3 | 5.5 | 10.3 |
| 0.60 | 8.7 | 10.5 | 7.5 | 10.2 |

TABLE 3-continued

Performance of completely split versus partially joint factorization of recurrent weights

| | Completely split | | Partially joint | |
|---|---|---|---|---|
| SVD threshold | Parameters (M) | CER | Parameters (M) | CER |
| 0.70 | 12.0 | 10.3 | 10.2 | 9.9 |
| 0.80 | 16.4 | 10.1 | 13.7 | 9.7 |

3. Embodiments of Mel and Smaller Convolution Filters

Switching from 161-dimensional linear spectrograms to 80-dimensional mel spectrograms reduces the per-timestep feature dimension by roughly a factor of 2. Furthermore, and likely owing to this switch, the frequency-dimension size of the convolution filters could be reduced by a factor of 2. In combination, this means about a 4× reduction in compute for the first and second convolution layers, and a 2× reduction in compute for the first GRU layer.

On the WSJ corpus as well as an internal dataset of around 1,000 hours of speech, little impact on accuracy from making this change were observed, and hence it was adopted for all experiments in Section C.

4. Gram-CTC and Increased Stride in Convolutions

Gram-CTC is a recently proposed extension to CTC for training models that output variable-size grams as opposed to single characters (by Liu et al., *Gram-CTC: Automatic unit selection and target decomposition for sequence labelling*, arXiv preprint arXiv:1703.00096, 2017, and in commonly-owned U.S. patent application Ser. No. 15/698,593, filed on 7 Sep. 2017, entitled "SYSTEMS AND METHODS FOR AUTOMATIC UNIT SELECTION AND TARGET DECOMPOSITION FOR SEQUENCE LABELLING"; each aforementioned document is incorporated by reference herein in its entirety and for all purposes). Using Gram-CTC, the time stride in the second convolution layer was able to be increased by a factor of 2 with little to no loss in CER, though the number of filters in that same convolution layer is doubled to compensate. The net effect is a roughly 2× speedup for the second and third GRU layers, which are the largest. This speed up more than makes up for the size increase in the softmax layer and the slightly more complex language model decoding when using Gram-CTC. However, for a given target accuracy, it is found that Gram-CTC models could not be shrunk as much as CTC models by means of low rank factorization. That is, the net effect of this technique is to increase model size in exchange for reduced latency.

5. Low-Rank Factorization versus Learned Sparsity

Figure 11:
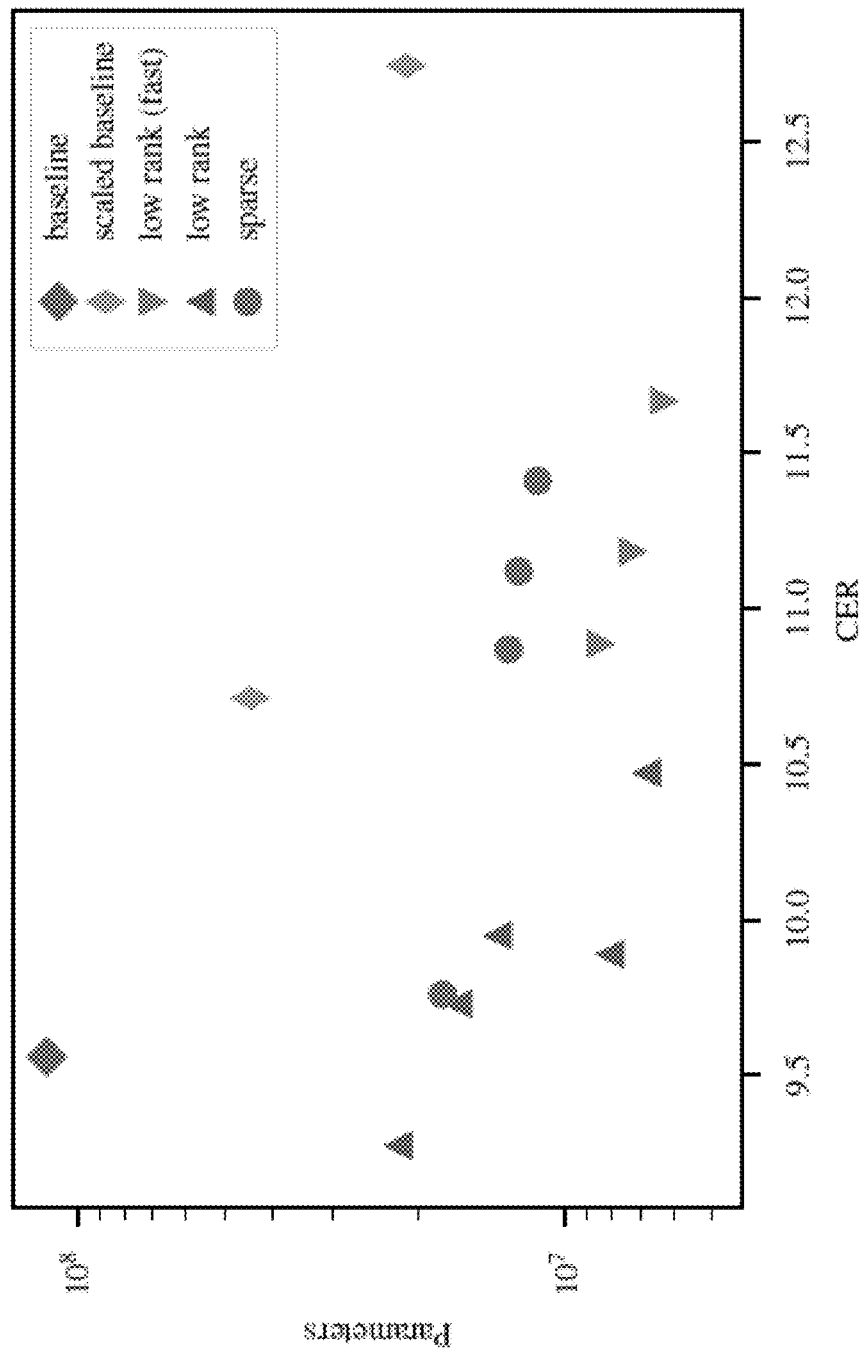
FIG. 11 graphically illustrates CER versus parameter on an internal dataset, noted by parameter reduction technique, according to embodiments of the present disclosure.

Shown in FIG. 11 is the parameter reduction versus relative CER increase trade-off for various techniques (noted with different shapes) on an internal data set of around 1,000 hours of speech.

The baseline model is a Deep Speech 2 model embodiment with three forward-GRU layers of dimension 2560, as described in Amodei et al. (*Deep Speech 2: End-to-end speech recognition in English and Mandarin*, 2016 International Conference on Machine Learning, pp. 173-182, and in commonly-owned U.S. patent application Ser. No. 15/358, 102, filed on 21 Nov. 2016, entitled "END-TO-END SPEECH RECOGNITION", and commonly-owned U.S. patent application Ser. No. 15/358,083, filed on 21 Nov. 2016, entitled "DEPLOYED END-TO-END SPEECH RECOGNITION"; each aforementioned document is incorporated by reference herein in its entirety and for all purposes). This is the same baseline model used in the experiments of Narang et al. (*Exploring sparsity in recurrent neural networks*, 2017 International Conference on Learning Representations (ICLR), which is incorporated by reference herein in its entirety and for all purposes), from which paper the sparse data points in the plot were also obtained. Shown also are versions of the baseline model but with the GRU dimension scaled down to 1536 and 1024. Overall, models with low-rank factorizations on all non-recurrent and recurrent weight matrices are seen to provide the best CER vs parameters trade-off. All the low rank models use growing GRU dimensions and the partially split form of low-rank factorization, as discussed in Sections F.1 and F.2. The models labeled fast in addition use Gram-CTC as described in Section F.4 and mel features and reduced convolution filter sizes as described in Section F.3.

As this was more of a preliminary comparison to some past experiments, the setup was not perfectly controlled and some models were, for example, trained for more epochs than others. It is suspected that, given more effort and similar adjustments like growing GRU dimensions, the sparse models could be made competitive with the low-rank models. Even so, given the computational advantage of the low-rank approach over unstructured sparsity, one or more embodiments are focused on the former. This does not, of course, rule out the potential usefulness of other, more structured forms of sparsity in the embedded setting.

G. Some Conclusions

In one or more embodiments, compressing and reducing the inference latency of LVCSR speech recognition models were addressed. To better compress models, a trace norm regularization technique was introduced and its potential for faster and more consistent training of low rank models on the WSJ speech corpus was demonstrated. To reduce latency at inference time, the importance of optimizing for low batch sizes was demonstrated and optimized kernels were released for the ARM64 platform. Finally, by combining the various techniques in this patent document, an effective path towards production-grade on-device speech recognition was demonstrated on a range of embedded devices

H. System Embodiments

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 12:
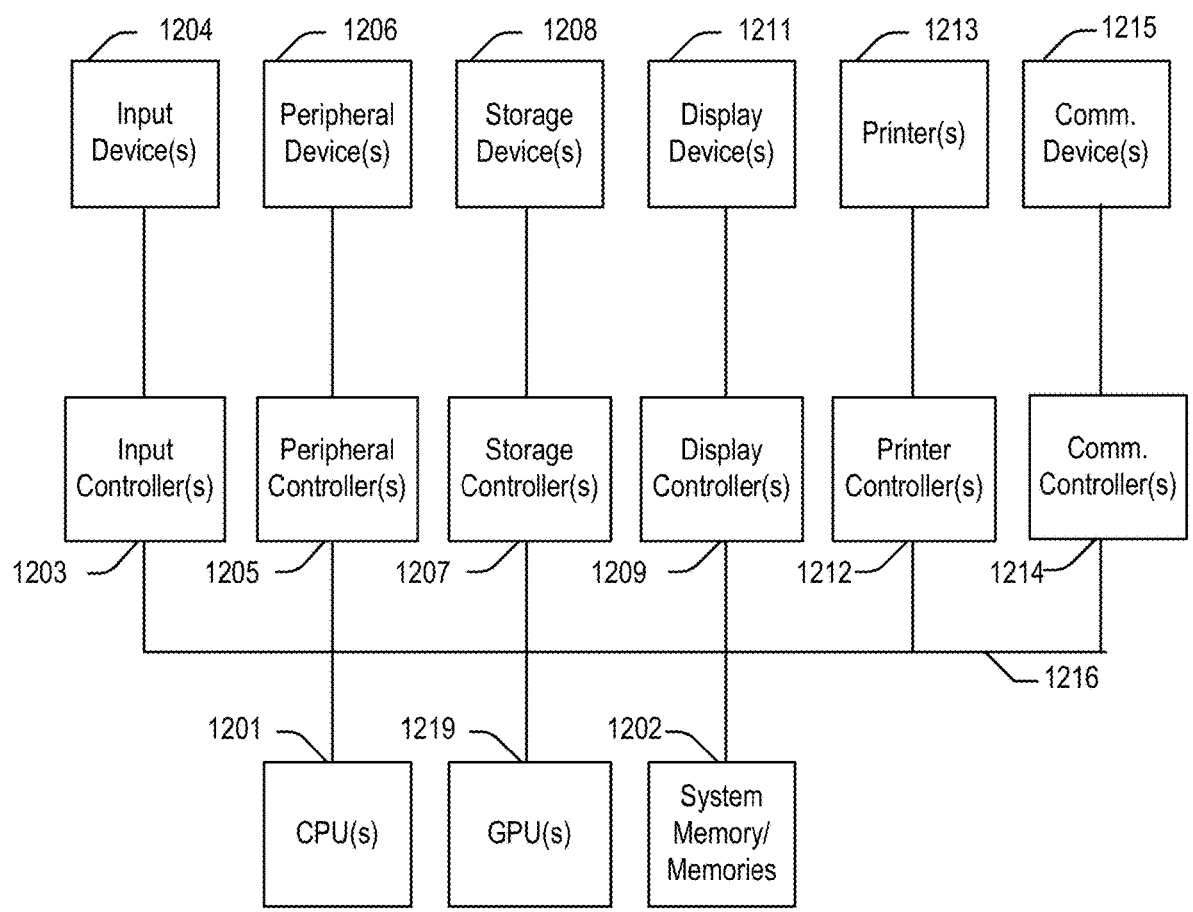
FIG. 12 depicts a simplified block diagram of a computing device/information handling system, in accordance with embodiments of the present disclosure.

FIG. 12 depicts a simplified block diagram of a computing device/information handling system (or computing system) according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more central processing units (CPU) 1201 that provides computing resources and controls the computer. CPU 1201 may be implemented with a microprocessor or the like, and may also include one or more graphics processing units (GPU) 1219 and/or a floating-point coprocessor for mathematical computations. System 1200 may also include a system memory 1202, which may be in the form of random-access memory (RAM), read-only memory (ROM), or both.

A number of controllers and peripheral devices may also be provided, as shown in FIG. 12. An input controller 1203 represents an interface to various input device(s) 1204, such as a keyboard, mouse, touchscreen, and/or stylus. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present invention. Storage device(s) 1208 may also be used to store processed data or data to be processed in accordance with the invention. The system 1200 may also include a display controller 1209 for providing an interface to a display device 1211, which may be a cathode ray tube (CRT), a thin film transistor (TFT) display, organic light-emitting diode, electroluminescent panel, plasma panel, or other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method to train a neural network model, the method comprising:
   replacing each of one or more weight matrices in the neural network model by a product of a first and a second matrices, the neural network model has a first parameter size requiring a first memory space for implementation;
   using a loss function that incorporates one or more terms related to norms of the first and the second matrices;
   training the neural network model to convergence to obtain a trained first matrix and a trained second matrix for each weight matrix;
   recovering each weight matrix by a multiplication of corresponding trained first and second matrices; and
   applying low-rank approximation by using truncated singular-value decomposition (SVD) on the one or more recovered weight matrices to obtain a trained neural network model with a second parameter size less than the first parameter size, the trained neural network model requiring a second memory space less than the first memory space for implementation.

2. The computer-implemented method of claim 1 wherein the one or more weight matrices comprise one or more recurrent weight matrices and one or more non-recurrent weight matrices.

3. The computer-implemented method of claim 2 wherein the one or more terms incorporated in the loss function comprise at least one hyperparameter to control strength of a sum of the norms of the first matrix and the second matrix.

4. The computer-implemented method of claim 3 wherein the norms are Frobenius norms of the first matrix and the second matrix.

5. The computer-implemented method of claim 3 wherein the at least one hyperparameter comprises a first hyperparameter for the one or more recurrent weight matrices and a second hyperparameter for the one or more non-recurrent weight matrices.

6. The computer-implemented method of claim 3 wherein the first hyperparameter for the one or more recurrent weight matrices is fixed as a multiple of the second hyperparameter for the one or more non-recurrent weight matrices.

7. The computer-implemented method of claim 2 wherein using the truncated SVD on the one or more recovered weight matrices comprises:
   implementing an SVD decomposition for each recovered weight matrix to obtain one or more singular values;
   retaining a fraction of the one or more singular values; and
   obtaining a low-rank approximation of each recovered weight matrix using the retained fraction of the one or more singular values.

8. The computer-implemented method of claim 2 wherein applying low-rank approximation by using truncated SVD comprises:
   concatenating the recovered weight matrices into one or more concatenated matrices;
   implementing an SVD decomposition for each concatenated matrix to obtain one or more singular values;
   retaining a fraction of the one or more singular values; and
   obtaining the low-rank approximation of each concatenated matrix using the retained fraction of the one or more singular values.

9. The computer-implemented method of claim 8 wherein the one or more concatenated matrices comprise a single recurrent matrix concatenated from the one or more recurrent matrices and a single non-recurrent matrix concatenated from the one or more non-recurrent matrices.

10. The computer-implemented method of claim 9 wherein the one or more recurrent matrices and the one or more non-recurrent matrices are concatenated along a first dimension into a single combined matrix for low-rank factorization.

11. A system to train a neural network, the system comprising:
    a neural network model comprising one or more recurrent layers and one or more non-recurrent layers, the neural network model having a first parameter size requiring a first memory space for implementation; and
    one or more processors configured to train the neural network model in a training process, the training process comprising:
       replacing each of one or more weight matrices in the neural network model by a product of a first matrix and a second matrix;
       using a loss function that incorporates one or more terms related to norms of the first and the second matrices;
       training the neural network model using the loss function with predetermined training epochs to obtain a trained first matrix and a trained second matrix for each weight matrix;
       recovering each weight matrix by a multiplication of the corresponding trained first matrix and trained second matrix; and
       applying low-rank approximation by using truncated singular-value decomposition (SVD) to the one or more recovered weight matrix to obtain a trained neural network model with a second parameter size less than the first parameter size, the trained neural network model requiring a second memory space less than the first memory space for implementation.

12. The system of claim 11 wherein the neural network model is trained by implementing the truncated SVD with a learning rate initiated with a learning rate used in training the neural network model in a last epoch of the predetermined training epochs.

13. The system of claim 11 wherein using the truncated SVD comprises:
    implementing an SVD decomposition for each recovered weight matrix in the neural network model into a product of a left unitary matrix, a diagonal matrix with one or more singular values, and a right unitary matrix;
    retaining a fraction of the one or more singular values according to a threshold variable;
    obtaining a low-rank approximation of each recovered weight matrix using the retained fraction of the one or more singular values;
    identifying a largest value of the threshold variable for each weight matrix to allow a parameter size of the neural network model less than or equal to a target number;

based on the identified largest value of the threshold variable, determining a finalized fraction of singular values to be retained; and using the finalized fraction of singular values to obtain a finalized low-rank approximation for each of the recovered weight matrices.

14. The system of claim 11 wherein applying low-rank approximation using truncated SVD comprises:

concatenating the recovered weight matrices into one or more concatenated matrices;

implementing an SVD decomposition for each concatenated matrix to obtain one or more singular values for each concatenated matrix;

retaining a fraction of the one or more singular values; and obtaining a low-rank approximation for each concatenated matrix using the retained fraction of the one or more singular values.

15. The system of claim 14 wherein the one or more concatenated matrices comprise a single recurrent matrix concatenated from the one or more recurrent matrices and a single non-recurrent matrix concatenated from the one or more non-recurrent matrices, and the concatenated single recurrent matrix and the single non-recurrent matrix are applied low-rank approximation separately.

16. The system of claim 15 wherein the one or more recurrent matrices and the one or more non-recurrent matrices are concatenated along a first dimension into a single combined matrix for low-rank factorization.

17. A non-transitory computer-readable medium or media comprising one or more sequences of instructions which, when executed by one or more processors, causes steps to be performed, the steps comprising:

replacing each of one or more weight matrices in a recurrent network model by a product of a first matrix and a second matrix, the recurrent network model having a first parameter size before training;

using a loss function that incorporates one or more terms related to norms of the first matrix and the second matrix;

training the recurrent network model to obtain a trained first matrix and a trained second matrix for each weight matrix;

recovering each weight matrix by the product of corresponding trained first and second matrices;

applying low-rank approximation by using a truncated singular-value decomposition (SVD) to the one or more recovered weight matrix; and outputting the recurrent network model with low-rank approximation as a trained recurrent network model, the trained recurrent network model having a second parameter size less than the first parameter size and requires a second memory space less than the first memory space for implementation.

18. The non-transitory computer-readable medium or media of claim 17 wherein the recurrent network model is a recurrent neural network model comprising one or more recurrent layers and one or more fully connected layers, the one or more weight matrices comprising one or more recurrent weight matrices in the one or more recurrent layers and one or more non-recurrent matrices in the one or more fully connected layers.

19. The non-transitory computer-readable medium or media of claim 18 wherein the loss function comprises one or more hyperparameters to control strength of the norms of the first matrix and the second matrix.

20. The non-transitory computer-readable medium or media of claim 19 wherein the one or more hyperparameters comprise a first hyperparameter for the one or more recurrent weight matrices and a second hyperparameter for the one or more non-recurrent weight matrices.

* * * * *